United States Patent [19]
Utsumi et al.

[11] Patent Number: 6,137,560
[45] Date of Patent: Oct. 24, 2000

[54] ACTIVE MATRIX TYPE LIQUID CRYSTAL DISPLAY APPARATUS WITH LIGHT SOURCE COLOR COMPENSATION

[75] Inventors: Yuka Utsumi, Hitachi; Katsumi Kondo, Hitachinaka; Ikuo Hiyama; Osamu Itoh, both of Hitachi; Masahito Ohe, Mobara; Kazuhiko Yanagawa, Mobara; Keiichiro Ashizawa, Mobara, all of Japan

[73] Assignee: Hitachi, Ltd., Tokyo, Japan

[21] Appl. No.: 08/740,008

[22] Filed: Oct. 23, 1996

[30] Foreign Application Priority Data

Oct. 23, 1995 [JP] Japan .................................. 7-273921
May 9, 1996 [JP] Japan .................................. 8-114739

[51] Int. Cl.⁷ .......................... G02F 1/1335; C09K 19/02
[52] U.S. Cl. ............................ 349/181; 349/141; 349/61
[58] Field of Search .............................. 349/61, 106, 104, 349/167, 10, 141, 181

[56] References Cited

U.S. PATENT DOCUMENTS

| Re. 33,987 | 7/1992 | Suzawa | 349/70 |
|---|---|---|---|
| 5,048,933 | 9/1991 | Asano . | |
| 5,132,825 | 7/1992 | Miyadera . | |
| 5,211,463 | 5/1993 | Kalmanash | 349/104 |
| 5,532,854 | 7/1996 | Fergason | 349/177 |

*Primary Examiner*—Kenneth Parker
*Attorney, Agent, or Firm*—Antonelli, Terry, Stout & Kraus, LLP

[57] ABSTRACT

A liquid crystal display apparatus includes a liquid crystal panel having a pair of substrates, a plurality of electrodes formed on at least one of the pair of substrates and a liquid crystal layer sandwiched between the pair of substrates, and a light source provided on the back surface of the liquid crystal panel. The light source has the luminous characteristic with the chromaticity of a warm color family, and the liquid crystal panel has a spectral transmission characteristic with the chromaticity of a cold color family, whereby the color of the light source can be compensated.

9 Claims, 27 Drawing Sheets

FIG. 20
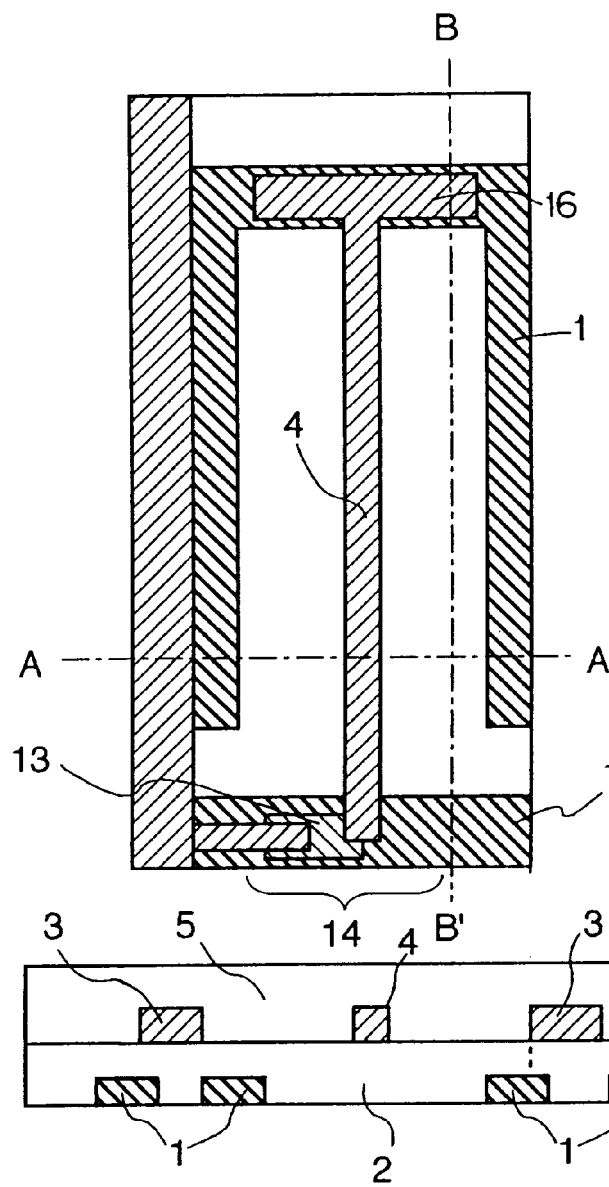
FIG. 20(a)
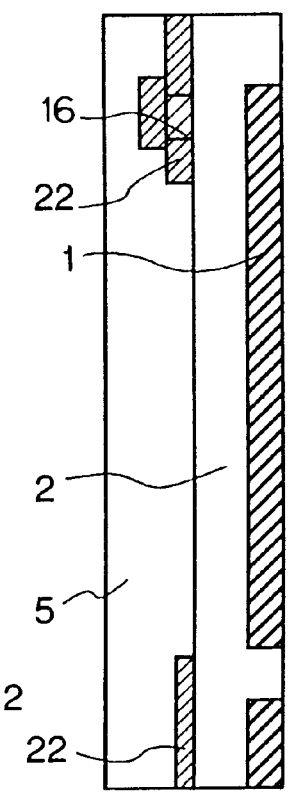
FIG. 20(b)

FIG. 21
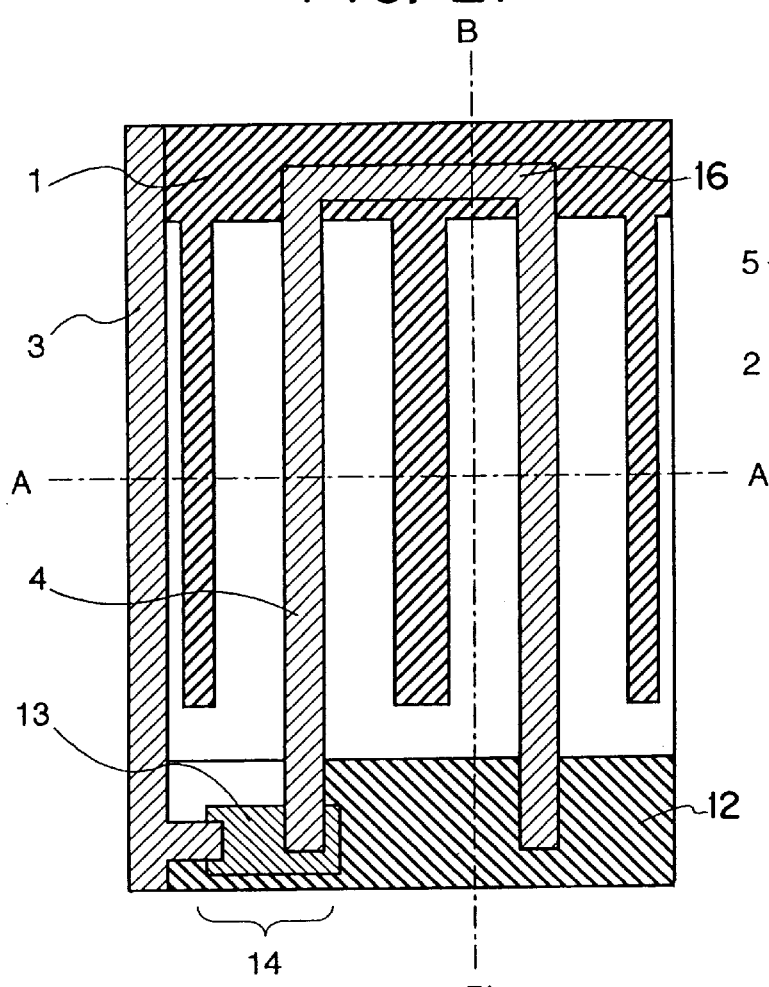
FIG. 21(b)
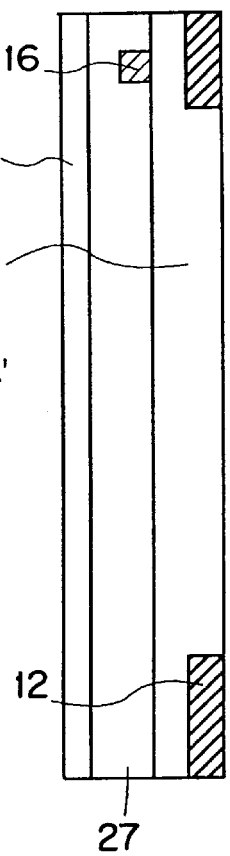
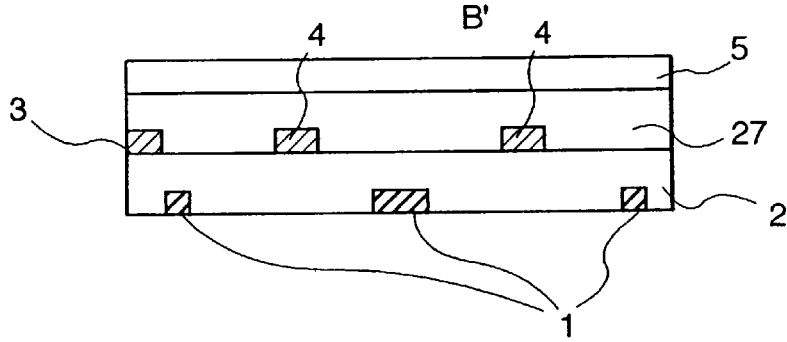
FIG. 21(a)

FIG. 22
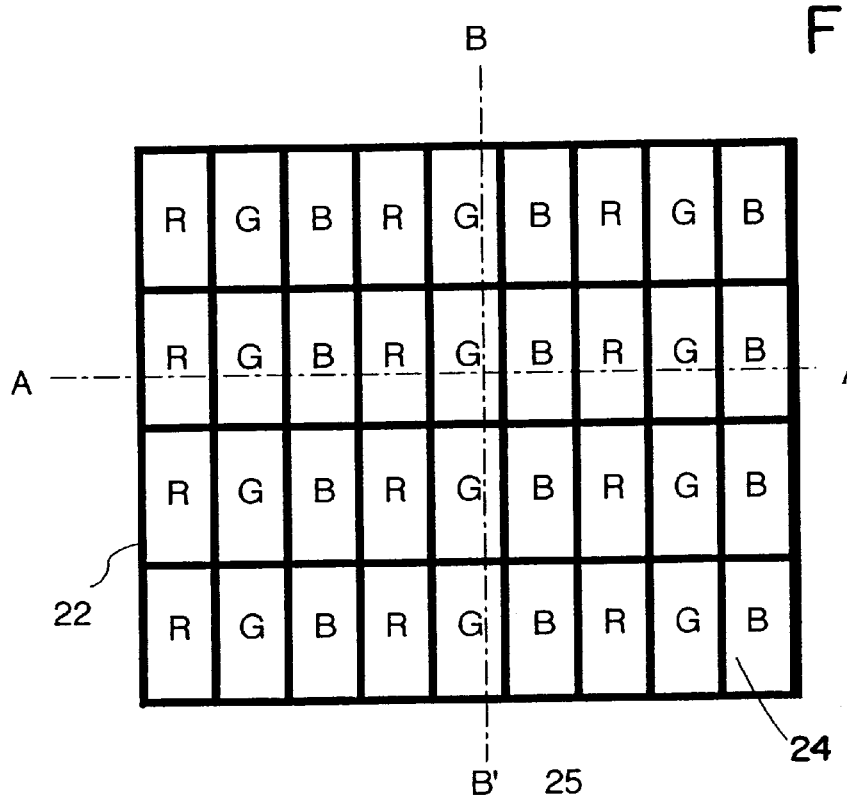
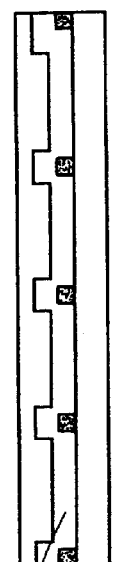
FIG. 22(b)
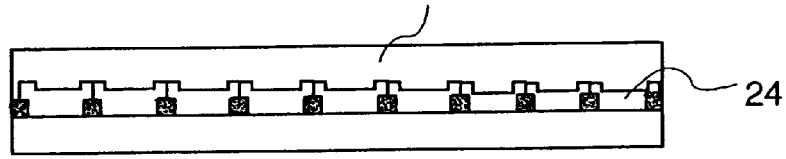
FIG. 22(a)

EMBODIMENT A
deff · Δn(490nm)=0.21 μm

APPLIED VOLTAGE

EMBODIMENT B
deff · Δn(490nm)=0.23 μm

APPLIED VOLTAGE

EMBODIMENT C
deff · Δn(490nm)=0.33 μm

EMBODIMENT D
deff · Δn(490nm)=0.33 μm

ACTIVE MATRIX TYPE LIQUID CRYSTAL DISPLAY APPARATUS WITH LIGHT SOURCE COLOR COMPENSATION

BACKGROUND OF THE INVENTION

The present invention relates to a liquid crystal display apparatus, and more particularly to an active matrix liquid crystal display apparatus.

There are shown the liquid crystal display apparatus, for example, in Japanese Patent Publication No. 63-21907 (1988), UP, WO91/10936 and Japanese Patent Application Laid-Open No. 6-222397 (1994), in which a pair of comb electrodes are used to allow a direction of an electric field applied to a liquid crystal to be parallel with a surface of a substrate. However, in a display system wherein a direction of an electric field applied to the liquid crystal is controlled to a direction parallel with a surface of a substrate by using active elements (hereinafter referred to as a horizontal electric field method), there is not disclosed the characteristic of a light source required to decrease the power consumption of the whole liquid crystal display apparatus. Further, there is not disclosed the configuration of the liquid crystal display apparatus required to suppress the color shift due to the appliance of a voltage and improve the color defect.

In the horizontal electric field method, opaque electrodes are provided in a display pixel portion in order to apply the electric field substantially in parallel with the surface of the substrate. As compared with the prior art method wherein an electric field is applied in a direction substantially vertical to the surface of the substrate by using a transparent electrode, the aperture ratio may be deteriorated and the brightness under a bright state may be lessen. Accordingly, it is necessary to use a high-intensity light source in the horizontal electric field method.

Because the display mode effective for the liquid crystal display apparatus of the horizontal electric field is a double refraction mode, the transmittance T can be generally expressed by the following equation (1).

$$T = To \sin^2 2\theta \cdot \sin^2\left(\frac{\pi d \Delta n}{\lambda}\right) \qquad (1)$$

where, To designates a coefficient and is determined mainly by the transmittance of a polarizer, $\theta$ designates an angle between an effective optical axis in the liquid crystal layer and a transmittance axis for a polarized light, d thickness of the liquid crystal layer, $\Delta n$ anisotropy of refractive index of the liquid crystal layer, and $\lambda$ wavelength of light. Because the transmittance of the liquid crystal display apparatus has essentially the maximum value in a certain wavelength, the liquid crystal display elements are colored. One solution of the above equation is a value which satisfies such the condition that the peak wavelength becomes equal to the maximum wavelength 555 nm for luminous efficiency under the retardation of 0 order, that is, $(\pi d \cdot \Delta n/555) = \pi/2$. At this time, the transmittance falls suddenly on a short wavelength side of the peak wavelength, and it decreases gradually on a long wavelength side. Therefore, the liquid crystal display elements are colored in yellow. As a result, it is required to use a light source with the color of a cold color family which is the complementary color to yellow. In other words, it is required to use the light source with a high color-temperature characteristic.

In general, a fluorescent lamp is used as a light source for a liquid crystal display apparatus. Because the luminous efficiency of the fluorescent lamp in a short wavelength region is less than that in a long wavelength region, the brightness may be lessen and large consumption power is required to obtain a high brightness. Since the normal voltage of the battery must be maintained for a long time, for example, in a note book type personal computer or a personal digital assistance, it is required to avoid the increase of the consumption power.

Now, a display operation of the liquid crystal display apparatus of a horizontal electric field method can be obtained in the double refraction mode, and the transmittance T can be generally expressed by the following equation (2).

$$T = T_0 \cdot \sin^2 2\theta \cdot \sin^2[(\pi \cdot d_{\mathit{eff}} \Delta n)/\lambda] \qquad (2)$$

where, To designates a coefficient and is determined mainly by the transmittance of the polarizer used in the liquid crystal panel, $\theta$ designates an angle between an effective optical axis in the liquid crystal layer and a transmittance axis for a polarized light, $d_{\mathit{eff}}$ thickness of the liquid crystal layer, $\Delta$ anisotropy of refractive index of the liquid crystal layer, and $\lambda$ wavelength of light. Further, the product of $d_{\mathit{eff}}$ and $\Delta$ is called as retardation. Where, the thickness $d_{\mathit{eff}}$ of the liquid crystal layer is not the thickness of the whole liquid crystal layer, but the thickness of the liquid crystal layer in which the direction of alignment is changed when a voltage is applied.

In general, molecules of the liquid crystal in the vicinity of the boundary surface of a liquid crystal layer does not change the alignment direction owing to the effect of anchoring at the boundary surface even if a voltage is applied. Accordingly, when the thickness of the whole liquid crystal layer sandwiched between the substrates equals $d_{\mathit{eff}}$, $d_{\mathit{eff}} < d_{LC}$ always is held between the thickness $d_{LC}$ and $d_{\mathit{eff}}$. It is estimated that the difference between $d_{LC}$ and $d_{\mathit{eff}}$ equals about 20 nm to 40 nm.

As clearly seen from the above equation (2), the transmittance of the liquid crystal display panel takes the maximum value at a specific wavelength (peak wavelength). Therefore, the liquid crystal display element is easy to be colored, in other words, it is easy to be unnecessarily colored.

Generally, the liquid crystal panel is constructed so as that the peak wavelength may become equal to the maximum wavelength 555 nm for luminous efficiency, that is,$(\pi d \cdot \Delta n/555) = \pi/2$. At this time, the liquid crystal display element is colored in yellow, because the spectral transmittance falls suddenly on a short wavelength side of the peak wavelength, and it decreases gradually on a long wavelength side.

The extent of coloring extremely changes according to the appliance of a voltage to the liquid crystal. As the magnitude of the voltage value changes from the minimum voltage required to display to the medium tone display voltage and then the maximum voltage, the color tone is gradually changed. Therefore, the display state of colors is extremely deteriorated.

Because the difference between the thickness of the liquid crystal layers appears as the change in the peak wavelength in the birefringence mode, the local and abnormal thickness of the liquid crystal display layer causes display defects such as the variations of the intensity and/or color tone, which are different from those in its surrounding area.

SUMMARY OF THE INVENTION

An object of the present invention is to provide an improved liquid crystal display apparatus, which the low power consumption and the fine display characteristic are compatible with each other.

Another object of the present invention is to provide an improved liquid crystal display apparatus which can suppress the color shift caused by the appliance of a voltage and reduce the occurrence of the color defect due to the local difference between the thickness of the liquid crystal layer.

A liquid crystal display apparatus according to the present invention comprises a liquid crystal panel having a pair of substrates, a plurality of electrodes formed on at least one of said pair of electrodes and a liquid crystal layer sandwiched between said pair of substrates, and a light source provided on one surface of said liquid crystal panel. The light source has a luminous characteristic with chromaticity of a warm color family and said liquid crystal panel has a characteristic of spectral transmittance with chromaticity of a cold color family. Thereby, the color of said light source can be compensated.

Where, The warm color family means colors with reddish hue such as yellow or orange in contradistinction with "white" illuminated from the standard illuminant C. The cold color family means colors with bluish hue in contradistinction with "white" illuminated from the standard illuminant C. While in the illuminant with the color of the warm color family, the transmittance is low in shorter wavelength, in the illuminant with the color of the cold color family, the transmittance is low in longer wavelength. Therefore, by combining them, it becomes possible to transmit almost uniformly light in the visible region. As a result, the display of the whole liquid crystal display apparatus approaches "white" illuminated from the standard illuminant C.

The reason why the power consumption is reduced by using the present invention is as follows. The fluorescent lamp with the color of the warm color family may consume the electric power less than one with the color of the cold color family to obtain the same intensity as each other. In general, assumed that the power consumption of the fluorescent lamp with the color temperature 6000K is 1, the power consumption required to obtain the same intensity becomes, 5% increase in the fluorescent lamp with the color temperature 8000K, 10% increase in one with 10000K, but 5% decrease in one with 4000K. For example, in order to compensate the color in the liquid crystal display element colored in yellow, by using the fluorescent lamp with the color temperature more than 6770K of the white standard illuminant C, it is required to use the illuminant with the color temperature, preferably more than 10000K. For example, if the electric power, 2 watts, is consumed by using the fluorescent lamp with the color temperature 8700K in the liquid crystal display apparatus of the horizontal electric field method, the electric power, 2.06 watts, is consumed when the fluorescent lamp with the color temperature 10000K is used. However, if the fluorescent lamp with the color temperature 6000K lower than that of the white standard illuminant C is used, the power consumption is 1.87 watts, and if one with 4000K, it becomes 1.79 watts.

The illuminant with the color of the warm color family may be made by changing the kind of the fluorescent materials and their mixing ratio. The narrow band emission type fluorescent lamp can be made by mixing the materials selected from each of the following A, B and C groups. A group has the emission peak in the range of 450 nm to 490 nm, and includes the following materials;

$3Ca_3(PO4)_2.Ca(F,Cl)_2$: $3b^{3+}$, $Sr_{10}(PO4)_6C_{12}$: $Eu^{2+}$, $(Sr, Ca)_{10}(PO4)_6C_{12}$: $Eu^{2+}$, $(Sr, Ca)_{10}(PO4)_6C_{12}$. $nB_2O_3$: $Eu^{2+}$, $(Ba,Ca,Mg)_{10}(PO4)_6C_{12}$: $Eu^{2+}$, $Sr_2P_2O_7$: $Sn^{2+}$, $Ba_2P_2O_7$: $Ti^{4+}$, $2SrO$. $0.84P_2O_6.0.16B_2O_3$: $Eu^{2+}$, $MgWO_4$, $BaA_{13}O_{13}$: $Eu^{2+}$, $BaMg_2Al_{16}O_{27}$: $Eu^{2+}$ $Mn^{2+}$, $SrMgAl_{10}O_{17}$: $Eu^{2+}$

B group has the emission peak in the range of 540 nm to 550 nm, and includes the following materials;

$LaPO_4$: $Ce^{3+}$, $Tb^{3+}$, $LaO_3.0.2SiO_2.0.9P_2O_5$: $Ce^{3+}$, $Tb^{3+}$, $Y_2SiO_5$: $Ce^{3+}$, $Tb^{3+}$, $CeMgAi_{11}O_{19}$: $Tb^{3+}$, $CdMgB_6O_{10}$: $Ce^{3+}$, $Tb^{3+}$ and C group has the emission peak in the vicinity of 610 nm, and includes the following materials;

$(Sr, Mg)_3(PO4_4)_2$: $Sn^{2+}$, $CaSiO_3$: $Pb^{2+}$, $Mn^{2+}$, $Y_2O_3$: $Eu^{3+}$, $Y(P,V)O_4$: $Eu^{3+}$

By changing the mixing ratio, it becomes possible to control the relative intensity of each of the emission regions, and thus realize the fluorescent lamp with various color temperatures. Further, by increasing the mixing ratio of the fluorescent materials having the emission peak around 610 nm, it becomes possible to make the fluorescent lamp with lower color temperature of the warm color family.

There are three methods to realize the liquid crystal display apparatus of the cold color family.

(1) A characteristic of the cold color family can be obtained by positioning the maximum value of the transmittance in a short wavelength area. The luminescence spectrum of the fluorescent material corresponding to green resides in the range of 540 nm to 550 nm, and that corresponding to blue in the range of 450 nm to 490 nm. It is, therefore, possible to obtain the liquid crystal display apparatus of the cold color family when the maximum luminescence spectrum is less than 520 nm, that is, $d.\Delta n=0.26$ in the equation (1), because the blue color is emphasized in such a case. Where, d is the thickness (deff) of the liquid crystal layer which changes the direction of alignment when a voltage is applied. The molecules of the liquid crystal in the vicinity of the boundary surface of the liquid crystal layer does not change the direction of alignment due to the effect of anchoring of the boundary surface even when a voltage is applied. When the thickness of the liquid crystal layer sandwiched between the substrates is dLC, the thickness of the liquid crystal layer which changes the direction of alignment when a voltage is applied is $d_{eff}$, $d_{eff} < d_{LC}$ and the difference between the deft and dLC may be about from 300 nm to 400 nm.

(2) The liquid crystal display panel is provided with a birefringent film, which is set so as that the peak wavelength of the spectrum transmittance in the liquid crystal display panel can be within the short wavelength range of the visible light of 400 nm to 520 nm, preferably 440 nm to 490 nm.

(3) The liquid crystal display panel has a color filter. The thickness of the liquid crystal layer at a portion where red light can be transmitted is thinner than the thickness $d_{LC}$ of the liquid crystal layer at a portion where green light or blue light can be transmitted.

A threshold voltage Ec in the liquid crystal display apparatus is expressed by the following equation.

$$Ec = \frac{\pi}{d_{LC}} \sqrt{\frac{K_2}{\varepsilon_0 \Delta \varepsilon}} \quad (3)$$

where, $d_{LC}$ designates the thickness of the liquid crystal layer, $K_2$ an elastic constant, $\Delta \varepsilon$ anisotropy of a dielectric constant of the liquid crystal, and $\varepsilon$ a dielectric constant for vacuum. As dLC becomes thin, the threshold voltage shifts to a higher voltage. By setting the thickness of the liquid crystal to be thin at a pixel portion where red is displayed, it becomes possible to shift red, that is, a voltage-transmittance characteristic in a long wavelength region to a higher voltage side. Thereby, the transmittance at the long wavelength region in each voltage is suppressed, and thus it becomes possible to make a liquid crystal display apparatus in which the transmittance in the short wavelength region is larger. In order to suppress sufficiently the transmittance in the high wavelength region and hold a color balance, it is preferable that the change in thickness of the liquid is suppressed within the range of 0.1 $\mu$m to 1 $\mu$m. For example, it is possible to thin the dLC by thickening the thickness of film at a portion of the color filter where red is displayed. It may be possible to thicken the thickness of film at a portion of the color filter where blue is displayed more than the $d_{LC}$ at portions where red and green are displayed. Also in this case, it is preferable that the change in the thickness of the liquid crystal layer is within the range of 0.1 $\mu$m to 1 $\mu$m.

The illuminant used in the present invention has the maximum value of at least one intensity in each range from 400 nm to 500 nm, from 500 nm to 600 nm and from 600 nm to 700 nm of said light source, and the liquid crystal panel has a characteristic of spectral transmittance required to satisfy the relation, x>y>z, where, x equals a value of the transmittance at the wavelength which shows the maximum value of the intensity in the range from 400 nm to 500 nm, y a value of the transmittance at the wavelength which shows the maximum value of the intensity in the range from 500 nm to 600 nm, z a value of the transmittance at the wavelength which shows the maximum value of the intensity in the range from 600 nm to 700 nm. Whereby it is possible to suppress the color shift caused by the change in the voltage applied and make the liquid crystal display apparatus having a fine display characteristic.

The reason why the fine display characteristic can be obtained will be explained hereinafter.

As described above, the liquid crystal display apparatus is generally worked in a birefringent mode. Its transmittance is expressed in the equation (2). Accordingly, the liquid crystal display apparatus has such the spectral transmittance that its maximum value is obtained at a certain wavelength, it suddenly decreases in the shorter wavelength side, and it gradually decreases in the longer wavelength side.

Assumed that the peak wavelength is around 550 nm. The transmittance suddenly decreases in the range of 400 nm to 500 nm which is in a blue region. As the brightness of the liquid crystal panel increases, the dependence of the transmittance on the wavelength becomes remarkable. Accordingly, it is the factor which causes the color shift according to the change in the voltage applied.

When the thickness of the liquid crystal layer at a certain portion is locally different from other portions in the liquid crystal display apparatus, the transmittance of blue at the portion remarkably changes and the color defect may occur. Accordingly, it should be noted that it is important to suppress the sudden decrease of the transmittance at the short wavelength region of the peak wavelength or the blue region. In order to suppress the sudden decrease of the transmittance at the short wavelength region, it is effective to shift the peak wavelength to the short wavelength side by setting a wavelength $\lambda$ to be shorter than 550 nm under the condition of $d_{eff} \cdot \Delta n(\lambda) = \lambda/2$. The more the wavelength $\lambda$ is far from the peak wavelength, the more the extent of the decrease of the transmittance increases. It is, therefore, possible to suppress the sudden decrease of the transmittance at the short wavelength region by setting the peak wavelength to a shorter wavelength side. It is also important to suppress the sudden decrease of the transmittance of the wavelength of emission from the illuminant used.

In general, the narrow band emission type fluorescent lamp is used for the illuminant of the liquid crystal display apparatus. Such the fluorescent lamp uses the materials which have the luminescence peak at each spectrum region of red (R), green (G) and blue (B).

Firstly, the following group has the emission peak in the range of 450 nm to 490 nm corresponding to blue, and includes the following materials;

$3Ca_3(PO4)_2 \cdot Ca(F,Cl)_2$: $3b^{3+}$, $Sr_{10}(PO4)_6C_{12}$: $Eu^{2+}$, $(Sr, Ca)_{10}(PO4)_6C_{12}$: $Eu^{2+}$, $(Sr,Ca)_{10}(PO4)_6C_{12} \cdot nB_2O_3$: $Eu^{2+}$, $(Ba, Ca, Mg)_{10}(PO4)_6C_{12}$: $Eu^{2+}$, $Sr_2P_2O_7$: $Sn^{2+}$, $Ba_2P_2O_7$: $Ti^{4+}$, $2SrO \cdot 0.8 \, 4P_2O_6 \cdot 0.16B_2O_3$: $Eu^{2+}$, $MgWO_4$, $BaA_{13}O_{13}$: $Eu^{2+}$, $BaMg_2Al_{16}O_{27}$: $Eu^{2+}$ $Mn^{2+}$, $S \, rMgAl_{10}O_{17}$: $Eu^{2+}$ The following group has the emission peak in the range of 540 nm to 550 nm corresponding to green, and includes the following materials;

$LaPO_4$: $Ce^{3+}$, $Tb^{3+}$, $LaO_5 \cdot 0.2SiO_2 \cdot 0.9P_2O_5$: $Ce^{3+}$, $Tb^{3+}$, $Y_2SiO_5$: $Ce^{3+}$, $Tb^{3+}$, $CeMgAi_{11}O_{19}$: $Tb^{3+}$, $CdMgB_5O_{10}$: $Ce^{3+}$, $Tb^{3+}$ and C group has the emission peak in the range of 610 nm to 630 nm corresponding to red, and includes the following materials;

$(Sr,Mg)_3(PO4_4)_2$: $Sn^{2+}$, $CaSiO_3$: $Pb^{2+}$, $Mn^{2+}$, $Y_2O_3$: $Eu^{3+}$, $Y(P,V)O_4$: $Eu^{3+}$

The luminescence characteristic of the narrow band emission type fluorescent lamp made by the fluorescent materials selected from each of the groups is as follows. The spectrum corresponding to blue is within the range of 450 nm to 490 nm, the spectrum corresponding to green is in the vicinity of 545 nm, and the spectrum corresponding to red is within the range of 610 nm to 630 nm.

Therefore, the characteristic of the spectrum transmittance which should be taken into consideration in the liquid crystal panel using the above narrow band emission type fluorescent lamp is as follows. It should have the range of 450 nm to 490 nm as a blue region, the range in the vicinity of 545 nm as a green region, and the range of 610 nm to 630 nm as a red region.

Accordingly, the most effective characteristic of the transmittance to suppress the color shift and/or color defects in the liquid crystal panel has the maximum value in the wavelength region of 450 nm to 490 nm. The retardation deff·$\Delta n(\lambda)$ should be set to be less than 0.245 $\mu$m ($\lambda$=490nm) to fit the peak of the transmittance to the above wavelength region. Further, it is necessary to use the material of liquid crystal which has small anisotropy $\Delta n$ of refractive index and thin the thickness of the liquid crystal layer to reduce the retardation $d_{eff} \cdot \Delta n$.

As described above, it is important to fit the characteristic of the luminescence at the short wavelength region of the illuminant to the peak of the transmittance of the liquid crystal panel, where, the spectral transmittance does not mean the spectral characteristic after passing through a color filter, etc., but the characteristic of the transmittance of the liquid crystal panel itself.

While the peak wavelength of the transmittance may change by a little by using a certain color filter, it is possible to ignore its effect for an actual use. The most important point in the present invention resides in the relationship between the peak of the intensity of the illuminant and the transmittance of the liquid crystal panel.

The magnitude of the anisotropy $\Delta n$ of the refractive index of the liquid crystal changes according to temperature. If the temperature of the liquid crystal panel changes due to the environment of the place where the display apparatus is used, the set value of the retardation $d_{eff} \cdot \Delta n$ may change.

In the liquid crystal which the anisotropy Δn of the refractive index is relatively small, the change in the anisotropy Δn itself of its refractive index becomes small. In addition, if the thickness deff is also small, the change in the production $d_{eff} \cdot \Delta n$ of the thickness and the anisotropy becomes smaller. Accordingly, by using the above liquid crystal, it is possible to expect the expansion of the margin of temperature and thus suppress the change in the retardation $d_{eff} \cdot \Delta n$.

BRIEF DESCRIPTION OF THE DRAWINGS

FIGS. 20 and 21 show two kinds of different configuration of the liquid crystal display panel of the horizontal electric field method.

FIG. 22 shows an illustration of a color filter according to on embodiment of the present invention

FIG. 26 shows an illustration of spectral transmittance.a

FIG. 28 shows an illustration of spectral transmittance.a

DESCRIPTION OF THE PREFERRED EMBODIMENTS

Embodiments of the liquid crystal display apparatus according to the present invention will be explained hereinafter with reference to the attached drawings.

Firstly, the configuration and the principle of operation of a liquid crystal display element of a horizontal electric field method will be explained with reference to FIG. 3 which shows the definition of a direction of rubbing and a direction of the axis of a polarizer.

Figure 3:
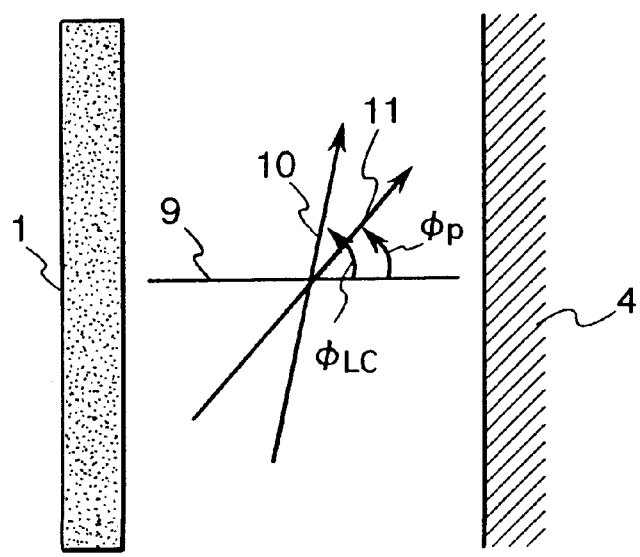
FIG. 3 shows the definition of a direction of rubbing and a direction of the axis of a polarizer.

In FIG. 3, reference numeral 1 designates a common electrode, 4 a pixel electrode, 9 designates a direction of an electric field, 10 a longitudinal axis (optical axis) of molecule of the liquid crystal, and 11 a transmitting axis of a polarized light. Further, ΦP designates an angle between the transmitting axis 11 and a polarizer 8 (see FIG. 1), and ΦLC an angle between the direction 9 of the electric field and the optical axis 10 in the vicinity of a boundary surface.

Because there are provided a pair of polarizers and a pair of boundary surfaces, respectively, upper one and lower one, they are expressed as ΦP1, ΦP2, ΦLC1, and ΦLC2, respectively, if necessary. Further, the longitudinal axis 10 of the molecule of liquid crystal is in the same direction as that of rubbing due to an alignment control film.

Secondly, the configuration and the principle of operation of a liquid crystal display panel of a horizontal electric field method will be explained with reference to FIG. 4.

Figure 4A:
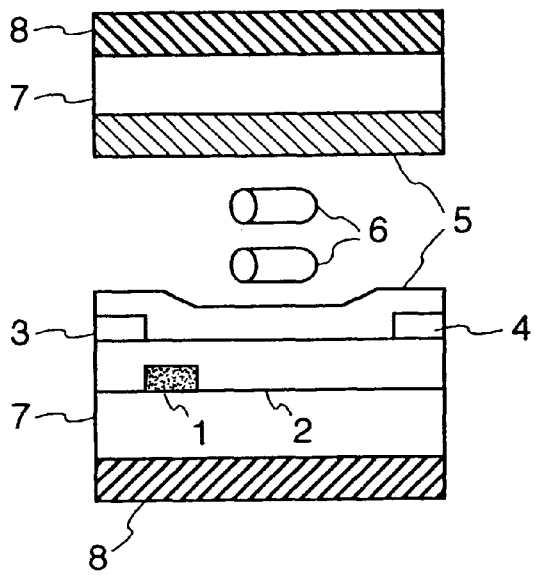
FIGS. 4A and 4B are side-sectional views each showing one pixel portion of the liquid crystal display panel of a horizontal electric field method.
Figure 4B:
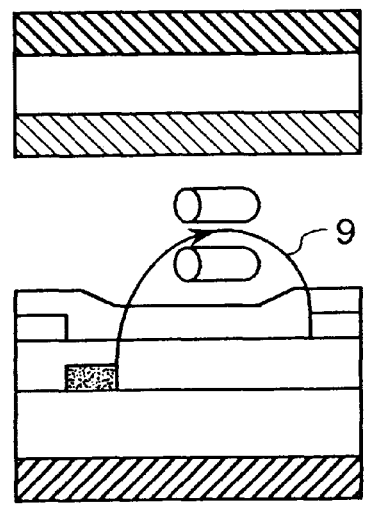
Figure 4C:
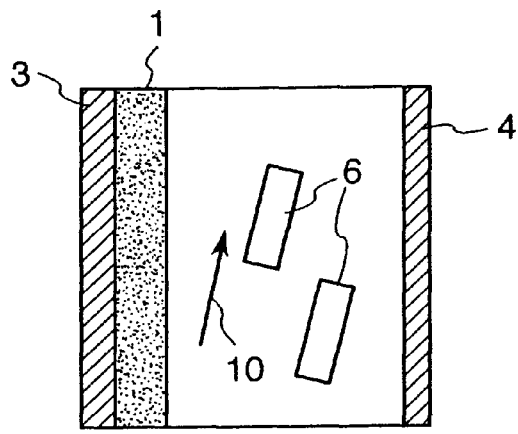
FIGS. 4C and 4D are front views thereof. In these figures, active elements are not shown except a gate insulating film 2.
Figure 4D:
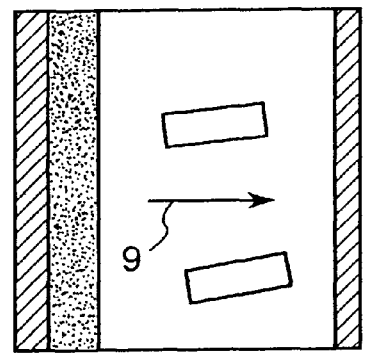
Figure 4D:
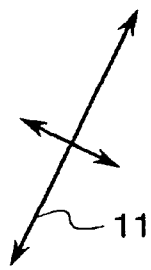
Figure 5:
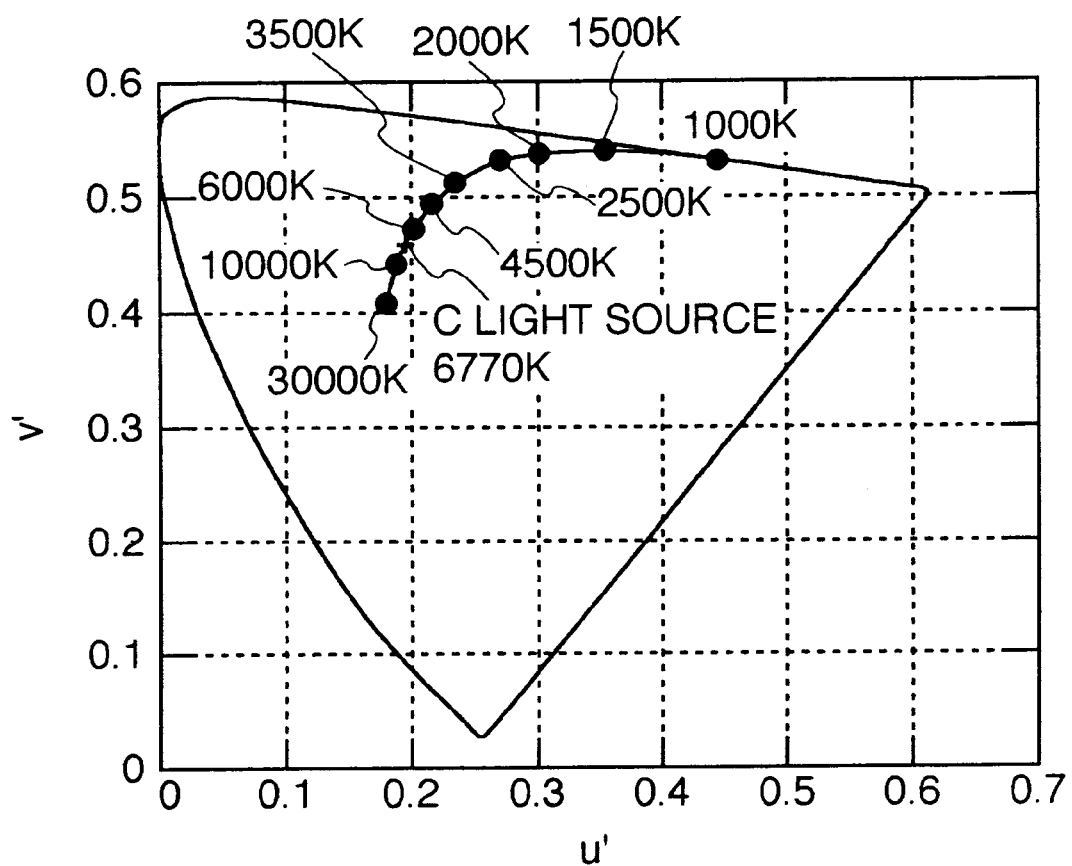
FIG. 5 shows color temperatures and chromaticity coordinates.

FIGS. 4A and 4B are side-sectional views each showing one pixel portion of the liquid crystal display panel of a horizontal electric field method, and FIGS. 4C and 4D are front views thereof. In these figures, active elements are not shown except a gate insulating film 2.

FIGS. 4A and 4C each shows a state that a voltage is not applied. Stripes of electrodes 1,3 and 4 are formed inside a pair of substrates 7, and alignment control films 5 are formed and alignment-performed on. those electrodes and substrates. In addition, polarizers 8 are provided outside the substrates 7, and these transmitting axes are shown in FIG. 4C. Although the liquid crystal composite is sandwiched between the alignment control films 5, only the liquid crystal molecules 6 are shown in the figures. In this example, it is assumed that the dielectric anisotropy of the liquid crystal molecules is positive.

The molecules of liquid crystal are alignment-controlled according to a rubbing direction 10 of the alignment control film 5 when a voltage is not applied. The angle ΦLC is controlled so as to satisfied the relation, 45°<|ΦLC|≦90° in consideration of the above dielectric positive anisotropy. In this example, the directions of alignment of the molecules of the liquid crystal on the upper and lower boundary surfaces are parallel to each other, namely, ΦLC1=ΦLC2.

When a voltage with a predetermined polarity is applied, and thus an electric field 9 is applied, the molecules of liquid crystal change their directions into a direction of the electric field 9 as shown in FIGS. 3B and 3D. As a result, the transmittance of light can be controlled according to the magnitude of the applied voltage, with respect to the transmitting axis of the polarized light of the polarizer 8, thereby the information can be displayed on the liquid crystal display panel.

It may normally work even if the composition of liquid crystal has negative dielectric anisotropy. In this case, it should be noted that an state of original alignment must be set to 0°<|ΦLC|≦45°.

Figure 1:
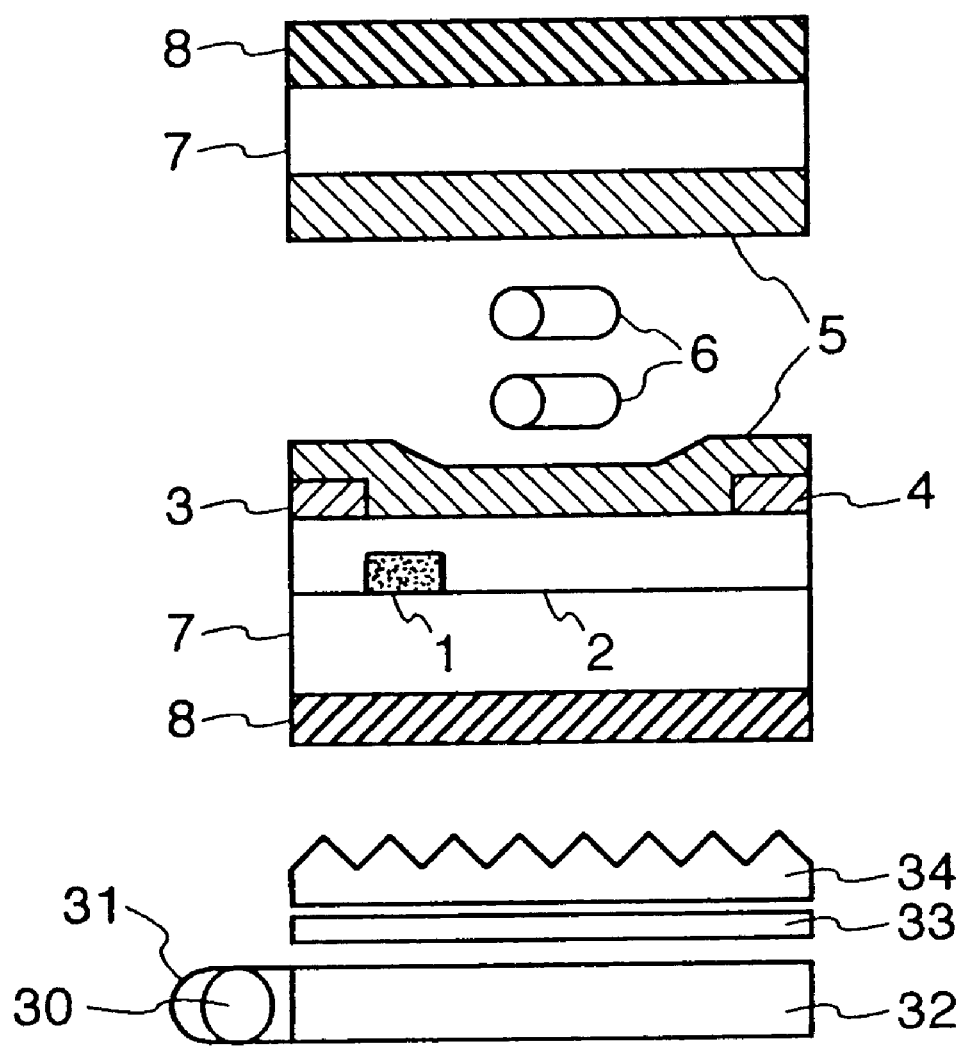
FIG. 1 shows a schematic configuration of the liquid crystal display apparatus according to the present invention.
Figure 2:
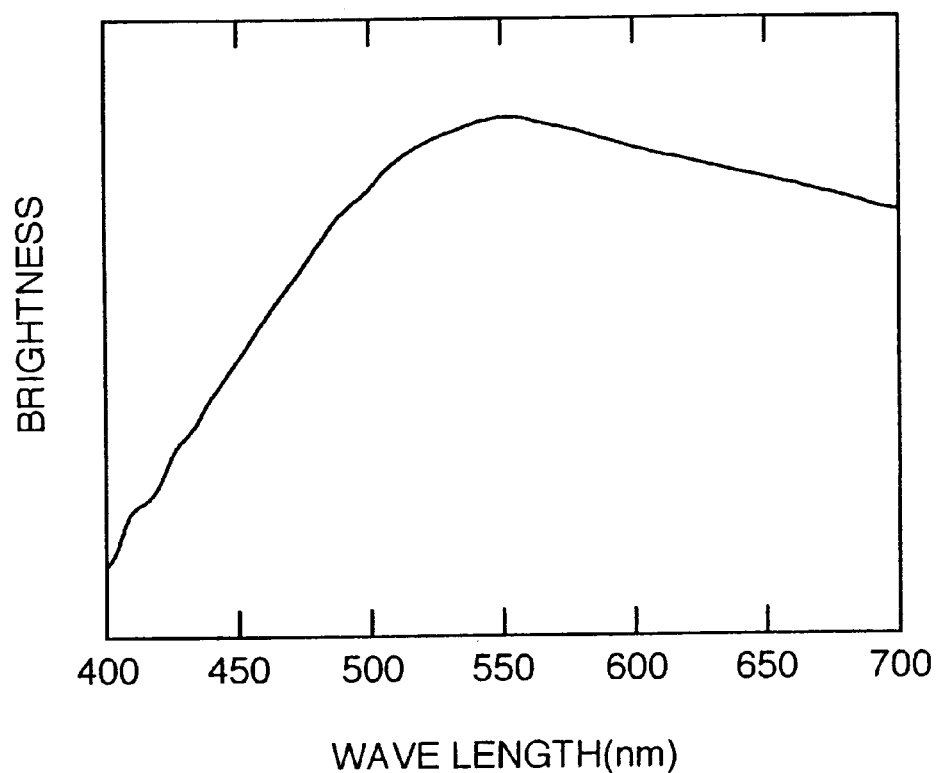
FIG. 2 shows a characteristic of spectral transmittance of a liquid crystal display panel of a horizontal electric field method.
Figure 8A:
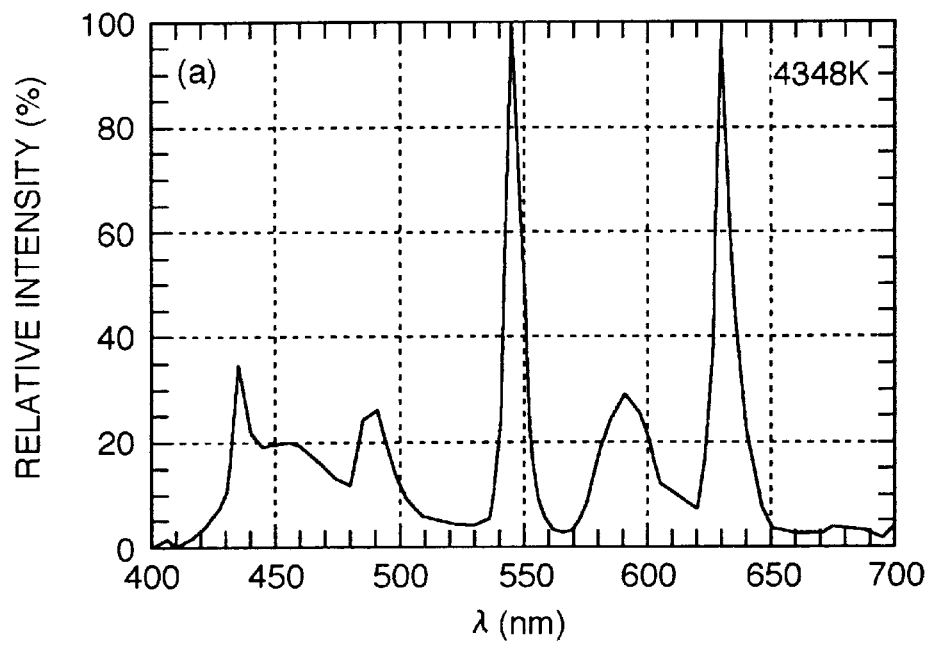
FIG. 8 shows the emission characteristic of an illuminant.

Referring now to FIG. 1, there is shown a schematic configuration of the liquid crystal display apparatus according to the present invention. The display apparatus is provided with an edge light type back light unit having a light source 30, a wave guide 32, a diffuser 33 and a prism sheet 34. The light source 30 has a color temperature 5885K and a luminescence spectrum shown in FIG. 8A.

Figure 9A:
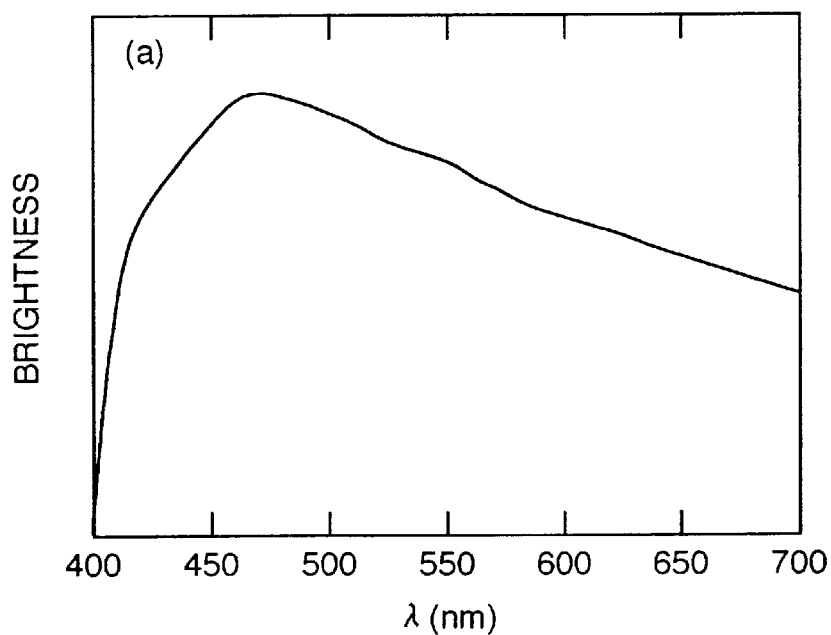
FIG. 9A shows the spectral transmittance of this liquid crystal display panel when a drive voltage is applied.
Figure 9B:
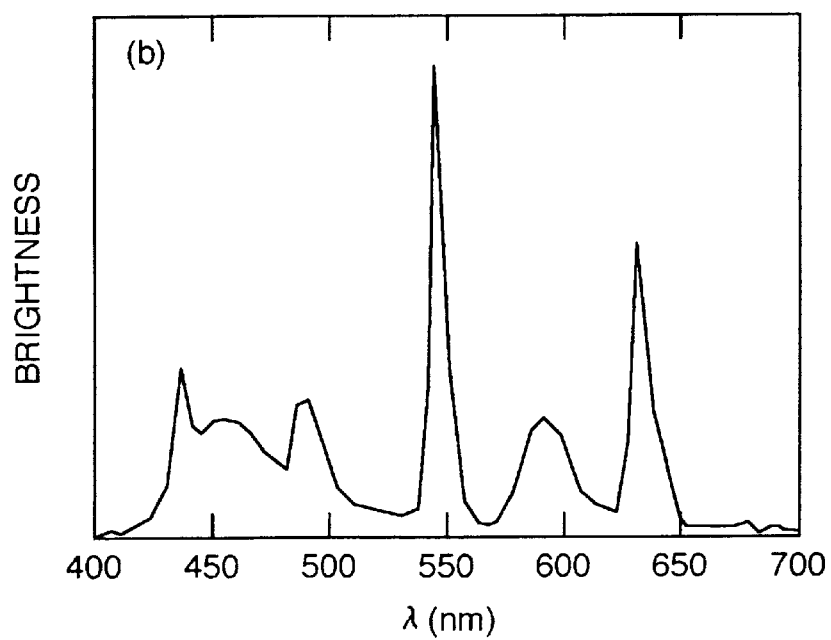
FIG. 9B shows a luminescence spectrum obtained by using the above light source.
Figure 10:
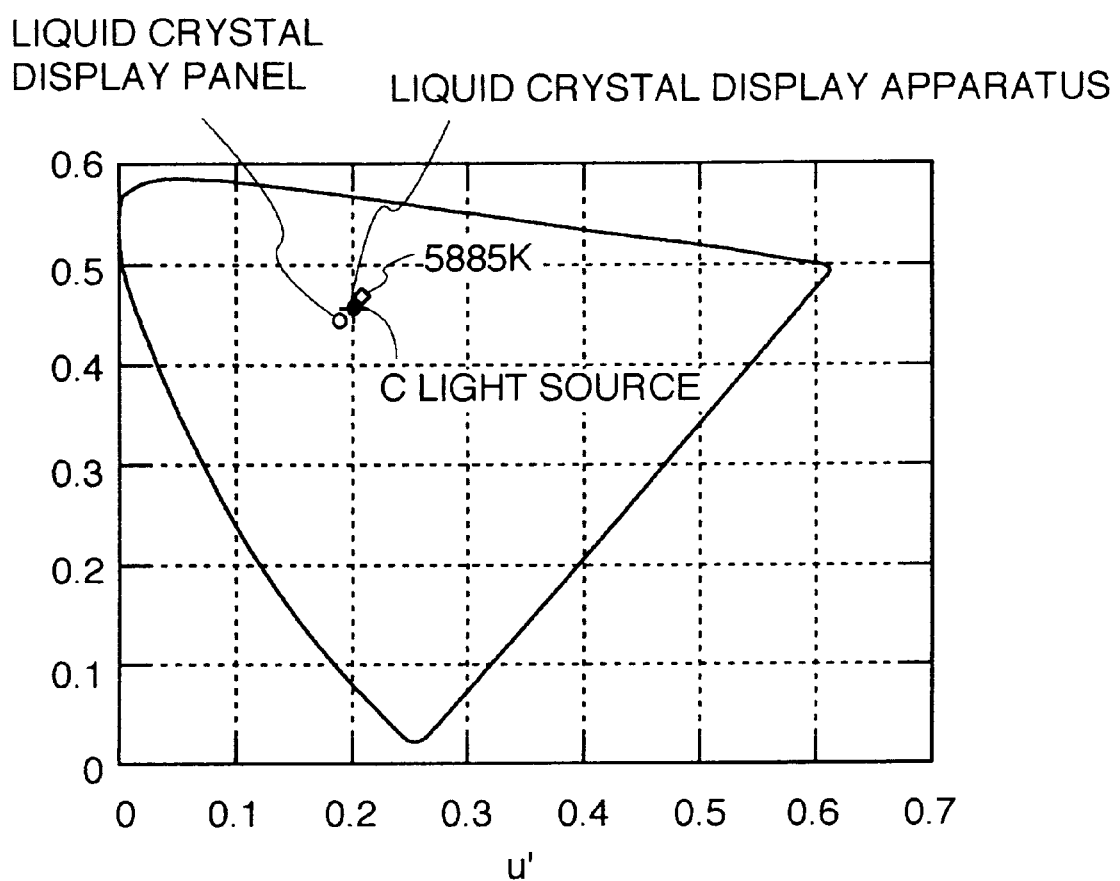
FIG. 10 shows chromaticity coordinates concerning the above construction members.

FIG. 9A shows the spectral transmittance of this liquid crystal display panel when a drive voltage is applied, and FIG. 9B shows a luminescence spectrum obtained by using the above light source. The power, 1.8 Watts, is consumed in the light source unit. Further, FIG. 10 shows chromaticity coordinates concerning the above construction members. The liquid crystal display panel uses a color of the cold color family. Fine white balance can be obtained by combining the display panel with a light source with a lower color temperature.

Nematic liquid crystal composition is inserted between the substrates, of which the anisotropy of the dielectric constant is positive, +9.0, and the anisotropy of the refractive index is 0.082 (589 nm, 20° C.). The gap d between cells equals 3.8 μm. As a result, $d_{LC}·\Delta n$ equals 0.31 μm, and $d_{eff}·\Delta n$ equals 0.28 μm.

Figure 8B:
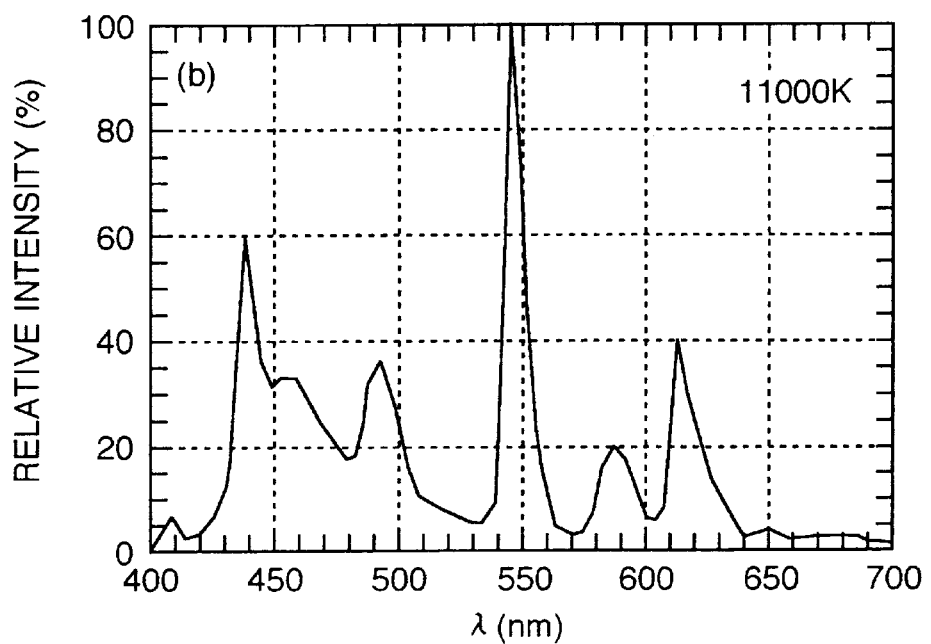

The liquid crystal display apparatus is provided with an edge light type back-light unit using a cold cathode fluorescent lamp as a light source. The light source 30 has a color temperature 11000K and a luminescence spectrum shown in FIG. 8B.

Figure 11A:
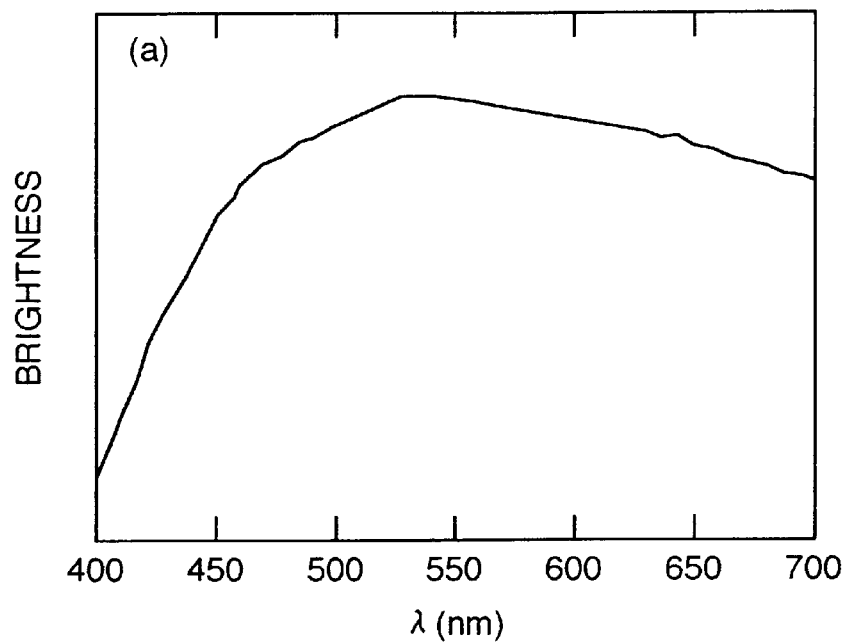
FIG. 11A shows the spectral transmittance of this liquid crystal display panel when a drive voltage is applied.
Figure 11B:
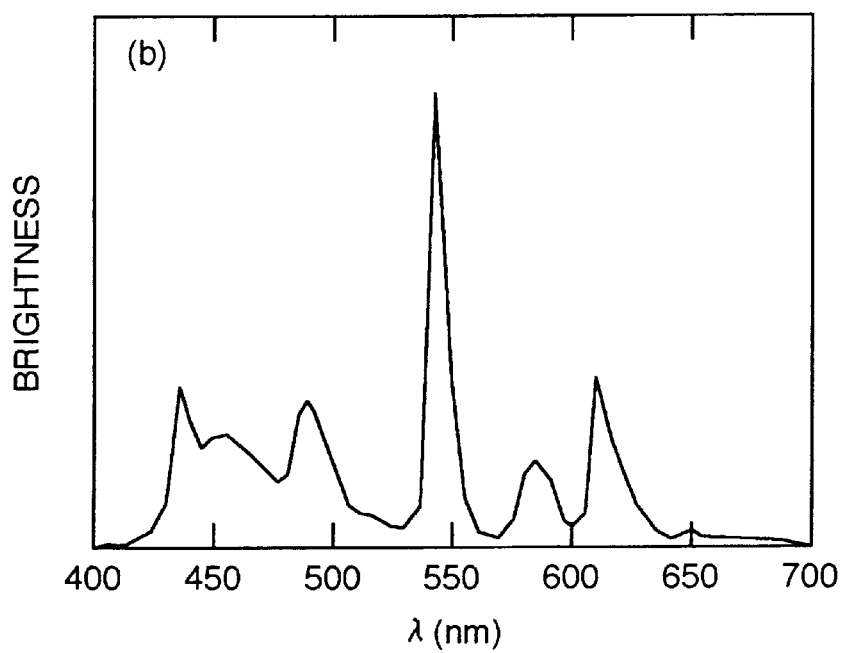
FIG. 11B shows a luminescence spectrum obtained by using the above light source.
Figure 12:
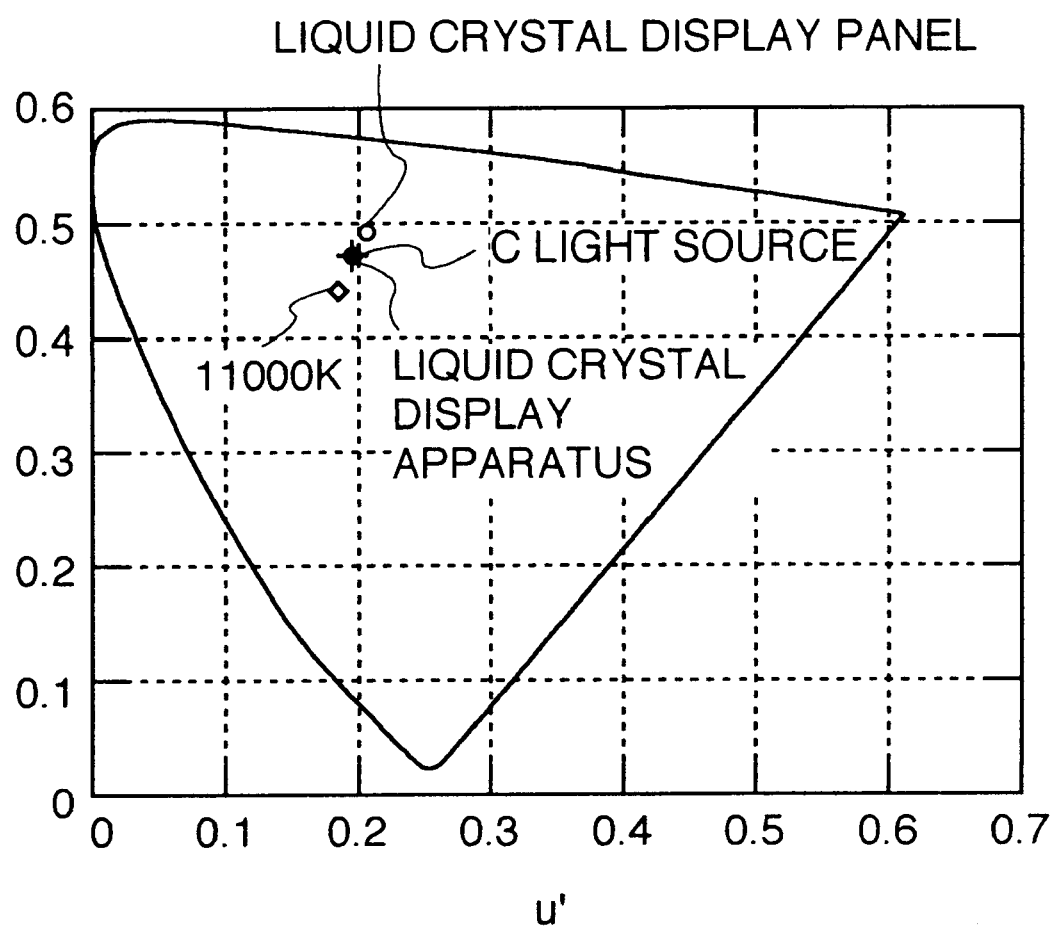
FIG. 12 shows chromaticity coordinates of the liquid crystal display apparatus.

FIG. 11A shows the spectral transmittance of this liquid crystal display panel when a drive voltage is applied, and FIG. 11B shows a luminescence spectrum obtained by using the above light source. Further, FIG. 12 shows chromaticity coordinates concerning the above construction members. In case of the combination of a yellowish liquid crystal display panel and a light source with the color of a cold color family, the power, 2 Watts, is consumed in the light source unit.

Figure 13A:
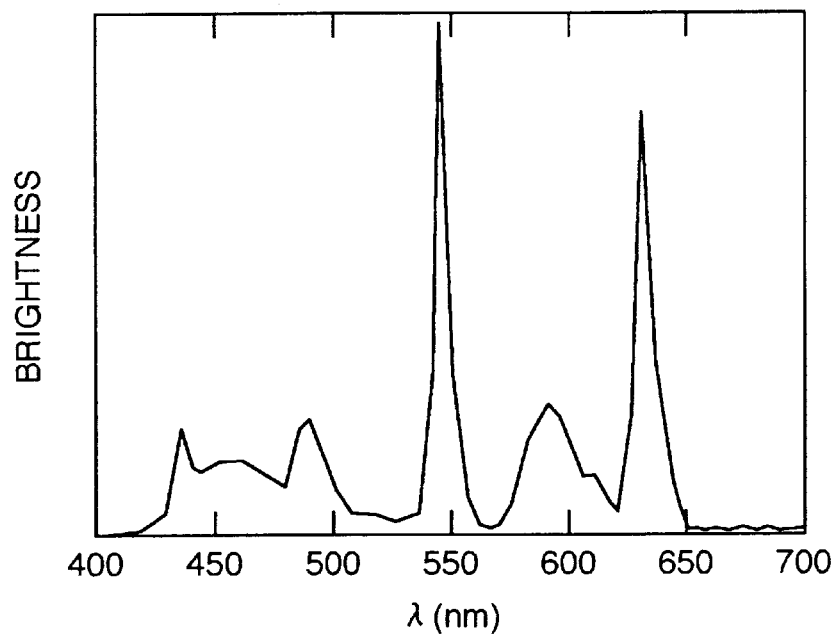
FIG. 13 shows chromaticity coordinates concerning the construction members.
Figure 13B:
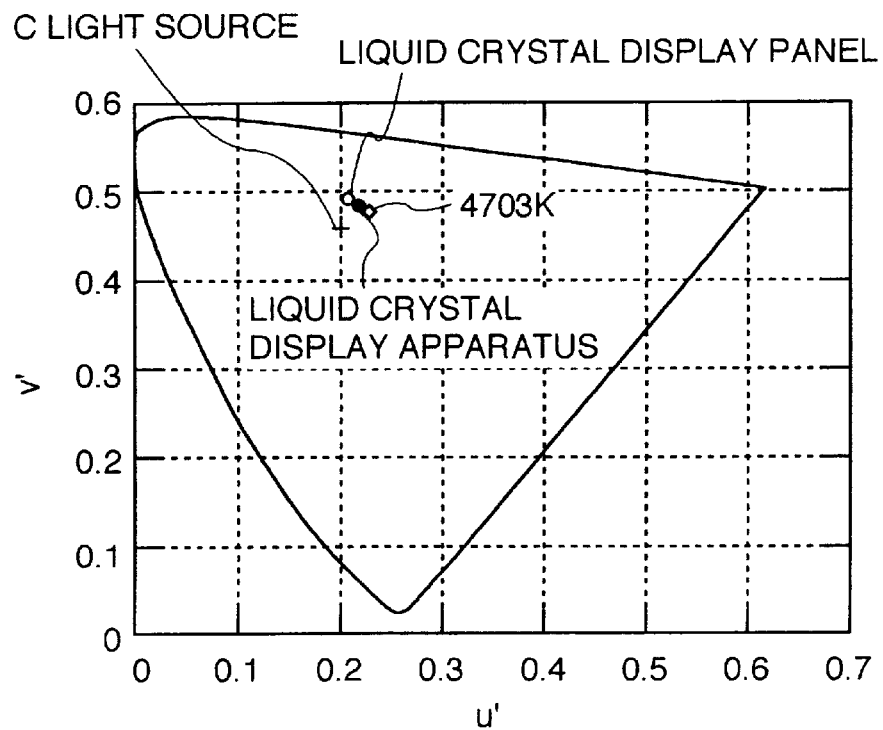

When the light source is exchanged to an edge light type back-light unit with a color temperature 5885K, the power, 1.8 Watts, is consumed in the light source unit. FIG. 13A shows a luminescence spectrum obtained by using the above light source, and FIG. 13B shows chromaticity coordinates concerning the above construction members. In accordance with this example, it is possible to obtain a visually yellowish display apparatus.

Figure 6:
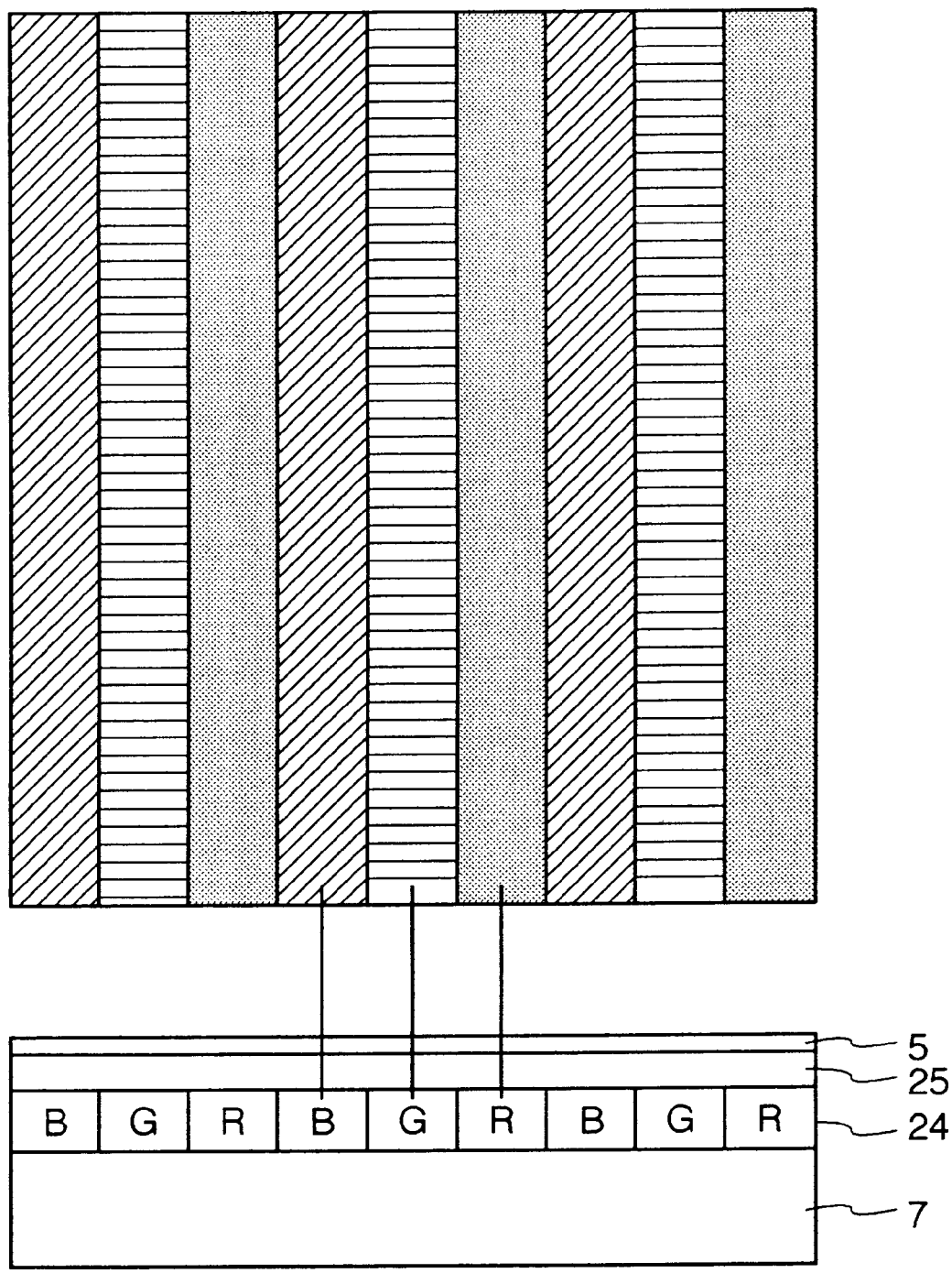
FIG. 6 shows the configuration of the substrate of a color filter.

A color filter 24 is provided on the substrate opposite to the substrate having transistor elements, as shown in FIG. 6.

Figure 14A:
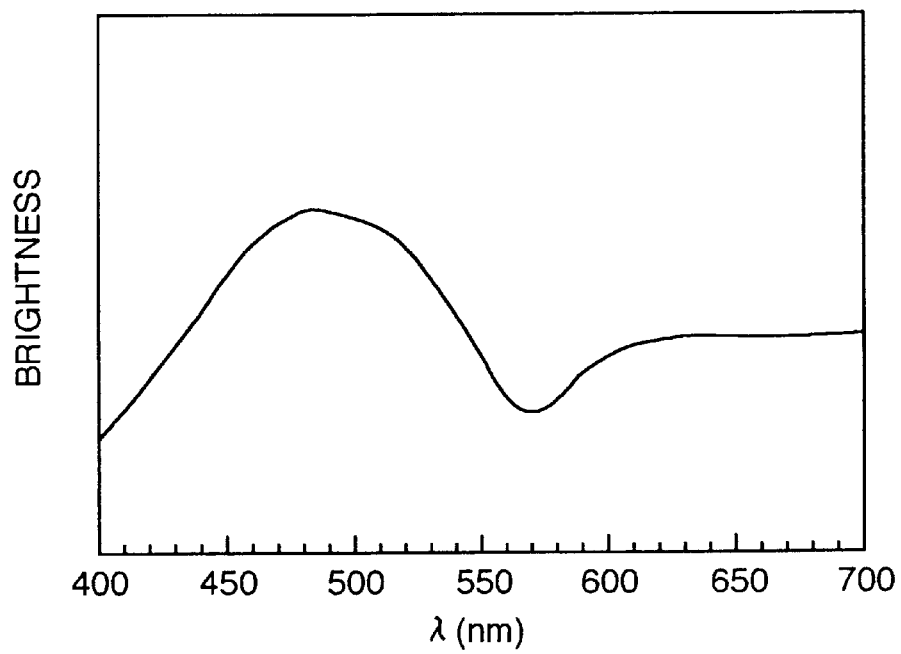
FIG. 14 shows chromaticity coordinates concerning the construction members
Figure 14B:
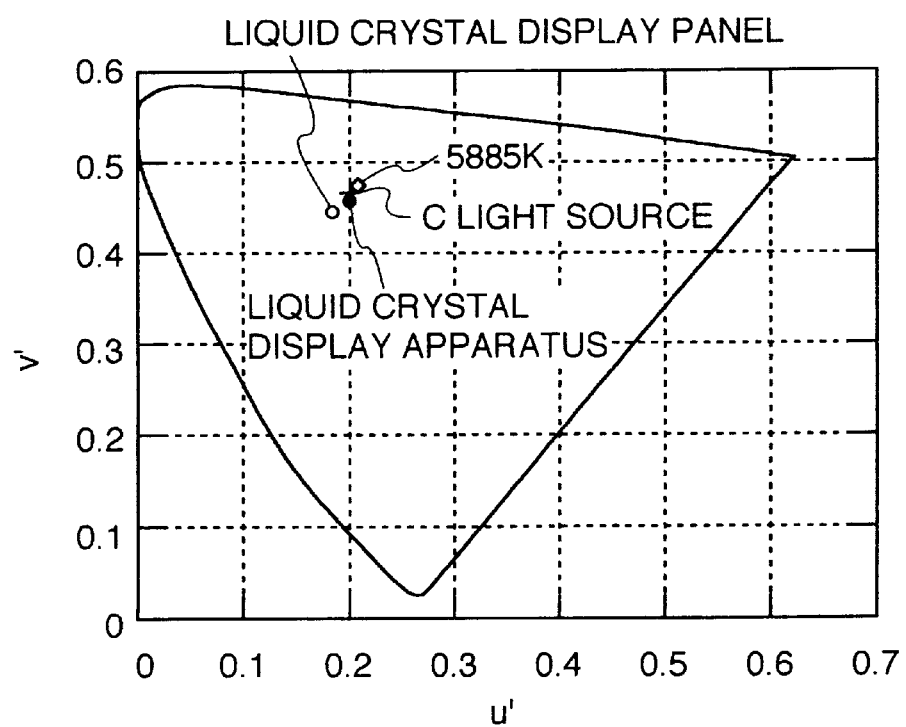

Nematic liquid crystal composition is inserted between the substrates, of which the anisotropy of the dielectric constant is positive, +7.3, and the anisotropy of the refractive index is 0.074 (589 nm, 20° C.). The gap d between cells equals 3.2 μm in such a state that spherical polymer beads are scattered and sandwiched between the substrates and the liquid crystal is sealed in. As a result, d·Δn equals 0.24 μm. FIG. 14A shows the spectral transmittance of this liquid crystal display panel when a drive voltage is applied, and FIG. 14B shows chromaticity coordinates concerning the liquid crystal display apparatus including a light source. The chromaticity coordinate under the appliance of a drive voltage is positioned around at a standard light source C. The power, 1.8 Watts, is consumed in the light source unit. According to this example, it is possible to obtain a liquid crystal display apparatus of a horizontal electric field type, which is suitable for a color display.

Nematic liquid crystal composition is inserted between the substrates, of which the anisotropy of the dielectric constant is positive, +9.0, and the anisotropy of the refractive index is 0.082 (589 nm, 20° C.). The gap d between cells equals 3.7 μm in such a state that spherical polymer beads are scattered and sandwiched between the substrates and the liquid crystal is sealed in. As a result, $d_{LC}·\Delta n$ equals 0.30 μm, and $d_{eff}·\Delta n$ equals about 0.27 μm. A phase plate is attached between the upper substrate and the polarizer, so as that an angle ΦF1 of an optical axis may become parallel with the upper substrate, in other words, ΦFC1=ΦP1=75°. The phase plate is made of poly carbonate and has retardation, 595 nm (550 nm). The liquid crystal display panel is provided with an edge light type back-light unit using a cold cathode fluorescent lamp as a light source. The light source has a color temperature 4348K and a luminescence spectrum shown in FIG. 8A.

Figure 15:
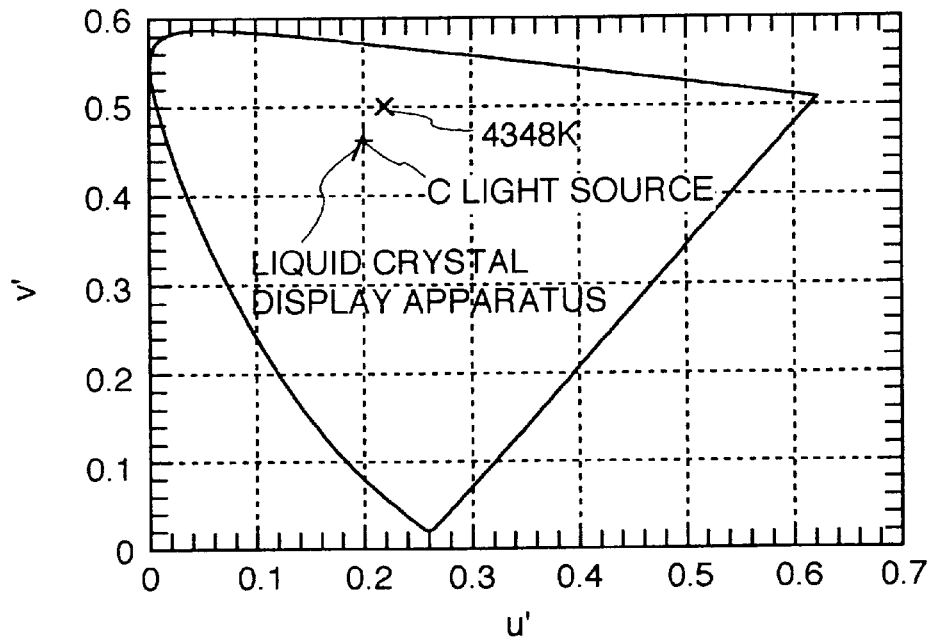
FIG. 15 shows a trail appeared on chromaticity coordinates.

FIG. 15 shows a trail appeared on chromaticity coordinates when a voltage of the liquid crystal display apparatus is switched from ON to OFF. The trail approaches a light source C. The power, 1.7 Watts, is consumed in the light source unit.

Figure 7A:
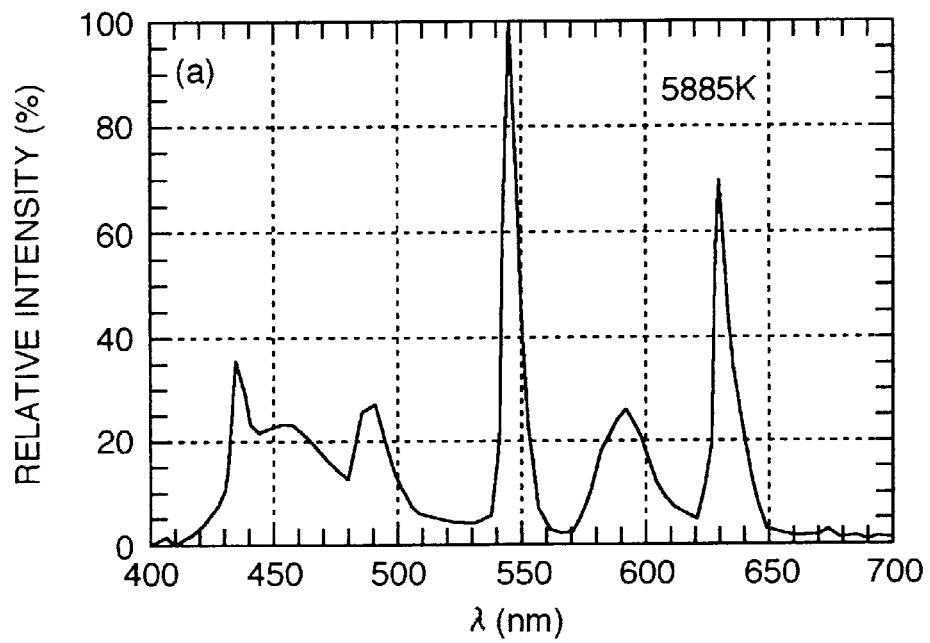
FIG. 7 shows the emission characteristic of an illuminant.
Figure 7B:
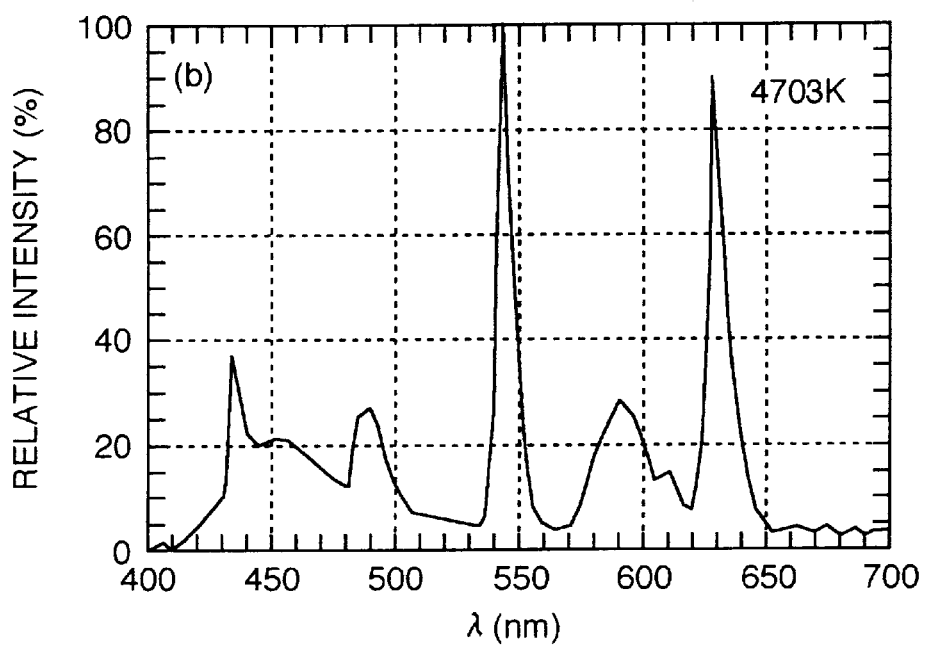

A stripe of color filter 24 with three colors, R,G,B, is provided on the substrate 7 opposite to the substrate having transistor elements, as shown in FIG. 6. A surface flattening protection film 25 is provided on the color filter 24, and the alignment film 5 is formed on the protection film 25. A phase plate is attached between the substrate and the polarizer, so as that an angle ΦF1 of an optical axis may become orthogonal to the upper polarizer, in other words, ΦF1=ΦP2=−15°. The phase plate is made of poly carbonate and has retardation, 349 nm (550 nm). The liquid crystal display panel is provided with an edge light type back-light unit using a cold cathode fluorescent lamp as a light source. The light source has a color temperature 4703K and a luminescence spectrum shown in FIG. 7B. The chromaticity coordinates when a drive voltage of the liquid crystal display apparatus is applied is close to the light source C. The power, 1.75 Watts, is consumed in the light source unit.

Figure 16:
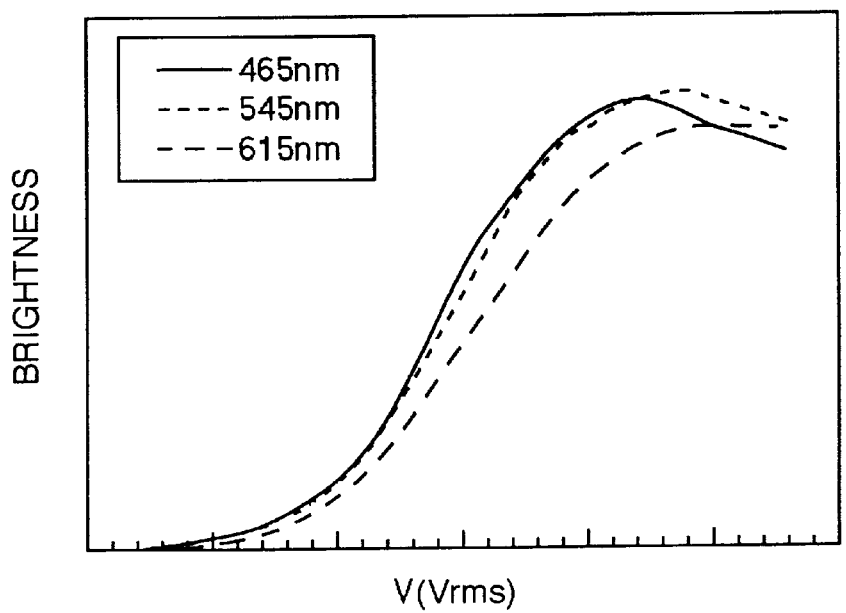
FIG. 16 shows a voltage-transmittance characteristic of the liquid crystal display apparatus.

The thickness of the film of the color filter is about 2 μm at the pixels of B and G, and about 2.5 μm at the pixels of R. The difference between these thickness remains as the level difference of about 0.3 μm after spin-coating the flat film. The level difference gives the difference of thickness between the liquid crystal layers. An edge light type back light unit is used for the liquid crystal display panel, which has a cold cathode fluorescent lamp with the color temperature 4703K. FIG. 16 shows a voltage-transmittance characteristic of this liquid crystal display apparatus at wavelength 615 nm, 545 nm and 465 nm, that is, the voltage-transmittance characteristic corresponding to each of the pixels of R,G and B. It is understood from FIG. 16 that the characteristic of the transmittance of the pixels R is shifted to a high voltage side. Accordingly, when the drive voltage for the liquid crystal panel is applied, its transmittance has such a characteristic in which red is suppressed. The white balance was fine when the drive voltage is applied, and the electric power, 1.75 watts was consumed in the illuminant unit.

Figure 17:
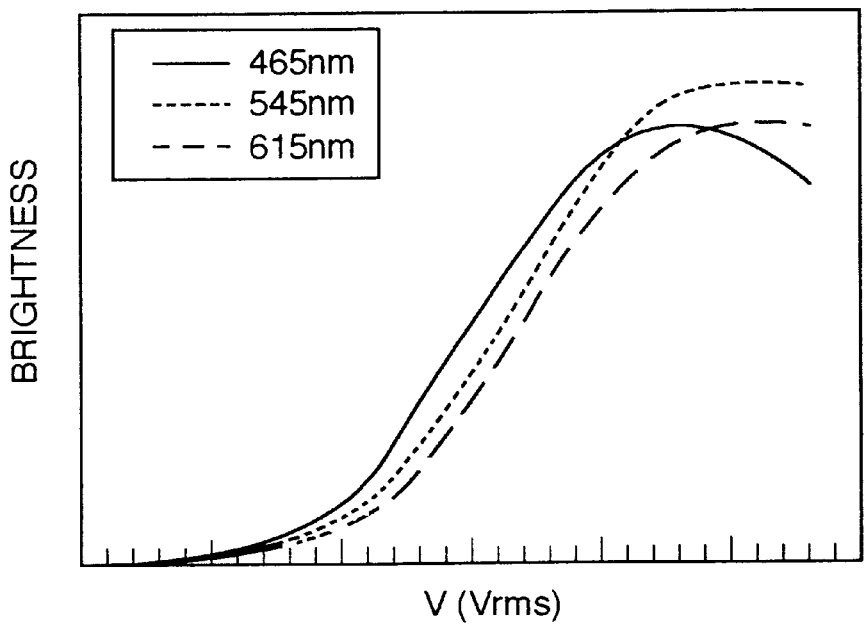
FIG. 17 shows a voltage-transmittance characteristic of this liquid crystal display apparatus.

The thickness of the film of the color filter is about 2 $\mu$m at the pixels of G and R, and about 1.5 $\mu$m at the pixels of B. The thickness of the liquid crystal layer is about 3.8 $\mu$m at the pixels of G and R, and about 4.1 $\mu$m at the pixels of B. An edge light type back light unit is used for the liquid crystal display panel, which has a cold cathode fluorescent lamp with the color temperature 4703K. FIG. 17 shows a voltage-transmittance characteristic of this liquid crystal display apparatus at wavelength 615 nm, 545 nm and 465 nm, that is, the voltage-transmittance characteristic corresponding to each of the pixels of R,G and B. It is understood from FIG. 17 that the characteristic of the transmittance of the pixels B is shifted to a low voltage side. Accordingly, when the drive voltage for the liquid crystal panel is applied, its transmittance has such a characteristic in which blue is emphasized. The white balance was fine when the drive voltage is applied, and the electric power, 1.75 watts was consumed in the illuminant unit.

Figure 18:
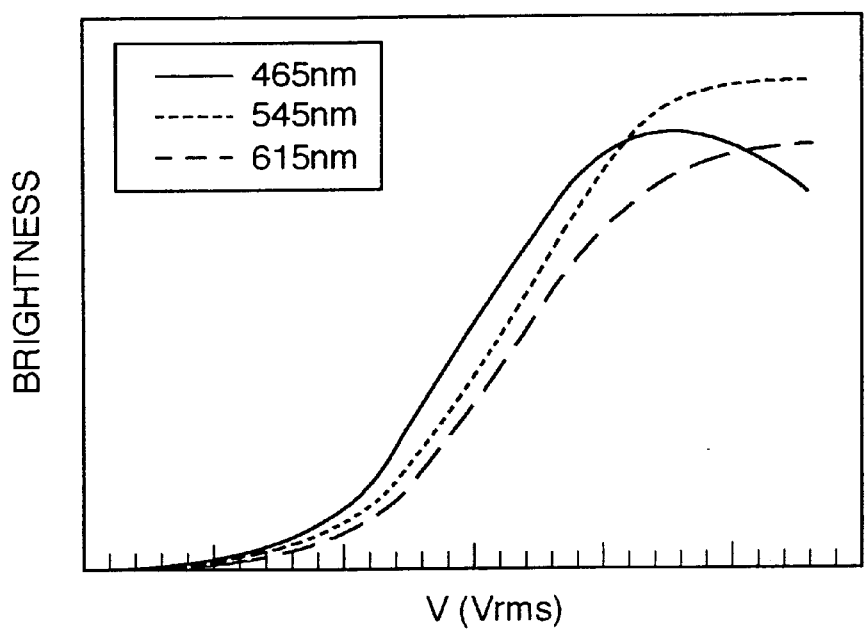
FIG. 18 shows a voltage-transmittance characteristic of this liquid crystal display apparatus.

The thickness of the film of the color filter is about 2 $\mu$m at the pixels of G, about 1.5 $\mu$m at the pixels of B and about 2.5 $\mu$m at the pixels of R. The thickness of the liquid crystal layer is about 4.2 $\mu$m at the pixels of G, about 3.9 $\mu$m at the pixels of R, and about 3.9 $\mu$m at the pixels of B. An edge light type back light unit is used for the liquid crystal display panel, which has a cold cathode fluorescent lamp with the color temperature 4348K . FIG. 18 shows a voltage-transmittance characteristic of this liquid crystal display apparatus at wavelength 615 nm, 545 nm and 465 nm, that is, the voltage-transmittance characteristic corresponding to each of the pixels of R,G and B. It is understood from FIG. 18 that the characteristic of the transmittance of the pixels B is shifted to a low voltage side, and the characteristic of the transmittance of the pixels R is shifted to a high voltage side. The white balance was fine when the drive voltage is applied, and the electric power, 1.7 watts was consumed in the illuminant unit.

Figure 19:
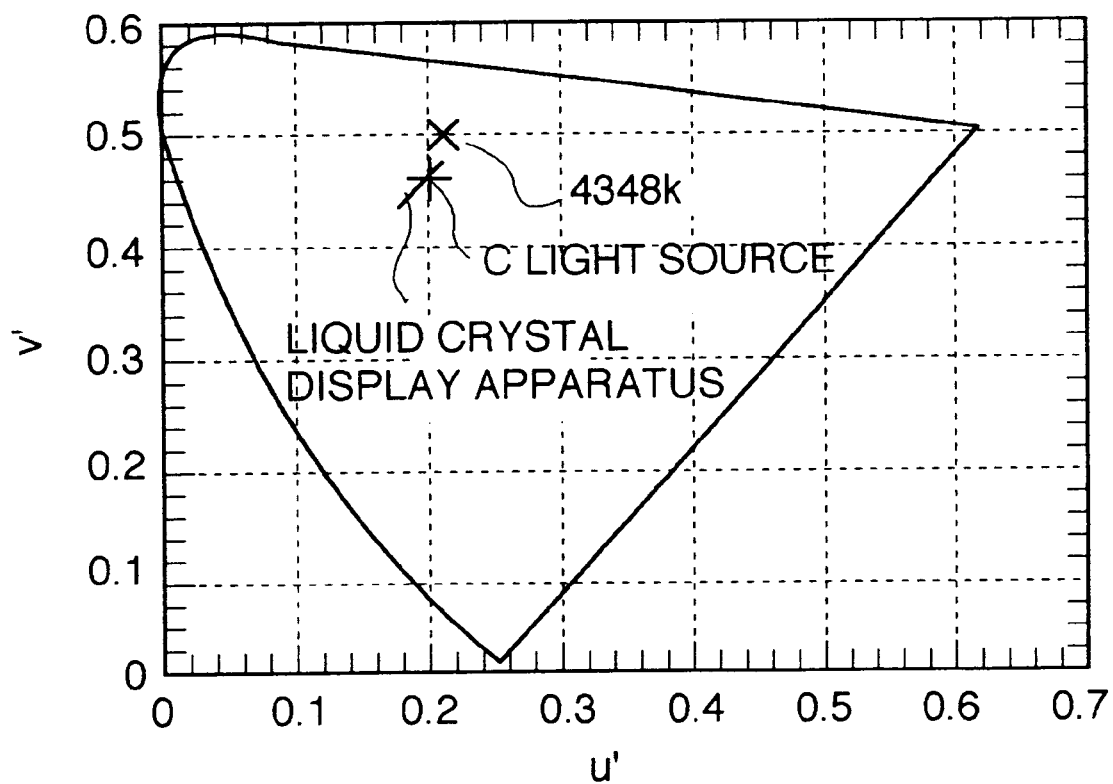
FIG. 19 shows a trail appeared on the chromaticity coordinates.

The thickness of the film of the color filter is about 2 $\mu$m at the pixels of G and R, and about 1.5 $\mu$m at the pixels of B. The thickness of the liquid crystal layer is about 4.5 $\mu$m at the pixels of G and R, and about 4.2 $\mu$m at the pixels of B. The phase difference film made of poly-carbonate, which has the retardation of 997 nm (550 nm), was inserted between the upper substrate and the polarizer, and attached so as that the angle $\Phi$F1 of its delay-phase axis is parallel with the upper polarizer, that is, $\Phi$F1=$\Phi$P1$\Phi$=75°. An edge light type back light unit is used for the liquid crystal display panel, which has a cold cathode fluorescent lamp with the color temperature 4348K . FIG. 19 shows a trail appeared on the chromaticity coordinates. It is understood from FIG. 19 that the trail approaches the standard illuminant C as a voltage is applied. The white balance was fine when the drive voltage is applied, and the electric power, 1.70 watts was consumed in the illuminant unit.

FIGS. 20 and 21 shows two kinds of different configuration of the liquid crystal display panel of the horizontal electric field method. These figures each shows a front view seen from a direction perpendicular to the surface of the substrate, a side-sectional view taken along the line A–A' and a side-sectional view taken along he line B–B'. a glass substrate is not shown.

In these figures, reference numeral 14 designates a thin film transistor, which has pixel electrodes (source electrodes) 4, signal electrodes (drain electrodes) 3, a scanning electrode (gate electrode) 12, and amorphous silicon 13. A common electrode 1 and the scanning electrode 12 are formed by patterning the same metal layer formed on the glass substrate. the signal electrodes 3 and the pixel electrodes 4 are formed by patterning the same metal layer formed on a gate insulating layer 2. A load capacitance 16 is formed by allowing the insulating layer 2 to sandwich between the pixel electrodes 4 and the common electrode 1.

In FIG. 20, the pixel electrodes 4 is arranged between two common electrodes 1. An alignment control film 5 is provided directly on the gate insulating layer 2, which has also the function of a surface-flattening film. In this case, the pitch between the pixels is 69 $\mu$m in a horizontal direction and 207 $\mu$m in a vertical direction.

The width of each electrode is determined as follows.

In the electrodes used as a wiring electrode bridging between a plurality of pixels, that is, the scanning electrode 12, the signal electrode 3 and the wiring portion (parallel with the scanning electrode, and in a horizontal direction in FIG. 20) of the common electrode 1, the width of those electrodes are set to be, for example, 14 $\mu$m to avoid the wire defect.

The width of the pixel electrode 4 formed independently every one pixel and the longitudinally extending portion of the common electrode 1 are respectively set to be 9 $\mu$m. the common electrode 1 and the signal electrode 3 are partially superposed (by 1 $\mu$m) through the insulating layer on each other. Thereby, it becomes unnecessary to provide a black matrix in a direction parallel with the signal electrode 3. Accordingly, there is provided only a black matrix 22 which can shield the light in a direction of the scanning electrode. In addition, a color filter 24 is provided only on the surface of one substrate.

While the black matrix 22 is provided on the substrate in which the electrodes are formed, it may be possible to provide the black matrix on the opposed substrate. These electrodes can be formed in a conventional way.

In the example of FIG. 21, the common electrodes 1 and the pixel electrodes 4 are formed like a comb, in which two pixel electrodes 4 are arranged between three common electrodes 1. The pitch between the pixels is 100 $\mu$m in a horizontally scanning direct ion and 300 $\mu$m in a vertical direction. The insulating layer is provided on the portion where the common electrodes 1 and the signal electrodes 3 are superposed. The thickness of the insulating layer is 2 $\mu$m.

Further, a surface-flattening insulating layer 27 is provided between the alignment control film 5 and gate insulating layer 2. The material for the surface-flattening insulating layer 27 is the same $SiO_2$ or SiN as the gate insulating layer 2. It may be possible to use other suitable material.

The width of each electrode is determined as follows.

In the electrodes used as a wiring electrode bridging between a plurality of pixels, that is, the scanning electrode 12, the signal electrode 3 and the wiring portion (parallel with the scanning electrode, and in a horizontal direction in FIG. 20) of the common electrode 1, the width of those electrodes are set to be 10 $\mu$m, 8 $\mu$m and 8 $\mu$m, respectively, to avoid the wire defect.

The width of the pixel electrode 4 formed independently every one pixel and the longitudinally extending portion of the common electrode 1 are set to be 5 $\mu$m and 6 $\mu$m, respectively.

Because the width of the electrode is narrow in this example, the possibility of breaks is increased due to the mixing of foreign particles. In FIG. 21, the black matrix 22 is provided on the opposed substrate, along with the color filter 24, as shown in FIG. 22. reference numeral 25 designates a protecting and surface-flattening layer. It is also possible to provide the color filter 24 on the opposed substrate or the substrate in which electrodes are formed. These electrodes can be formed in a conventional way.

Figure 23:
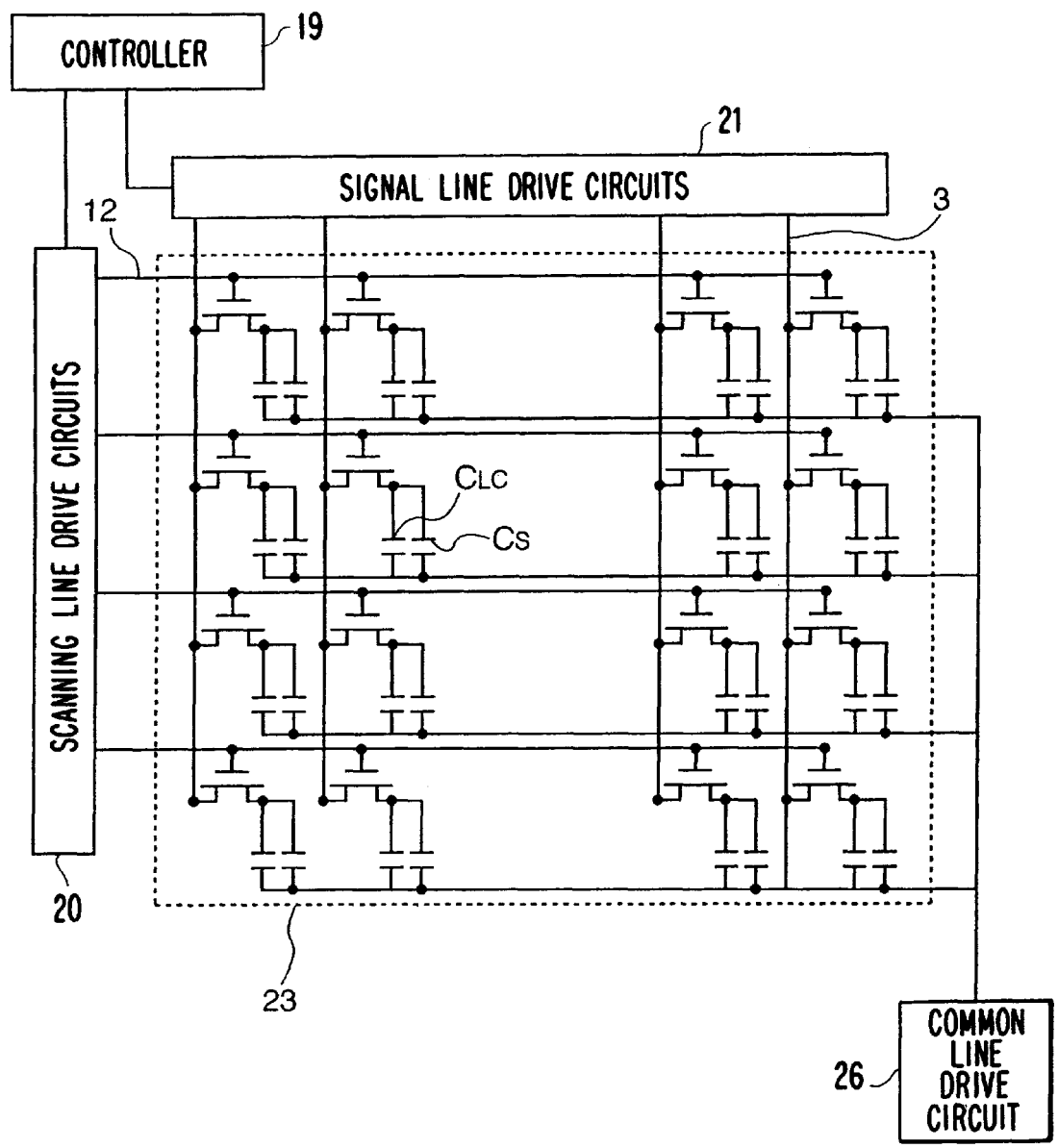
FIG. 23 shows one example of a driving circuit for the liquid crystal display apparatus.

FIG. 23 shows one example of a driving circuit for the liquid crystal display apparatus. In the driving circuit, a driving LSI is connected to the active matrix type liquid crystal display panel 23. Scanning line driving circuits 20, signal line driving circuits 21 and common line driving circuits 26 are provided on a TFT substrate which a plurality of electrodes are mounted.

A scanning signal voltage, an image signal voltage and a timing signal are supplied from a power circuit (not shown) and a controller 19, and then the display operation due to the active matrix drive is started.

Embodiments of the present invention will be explained hereinafter.

Figure 24:
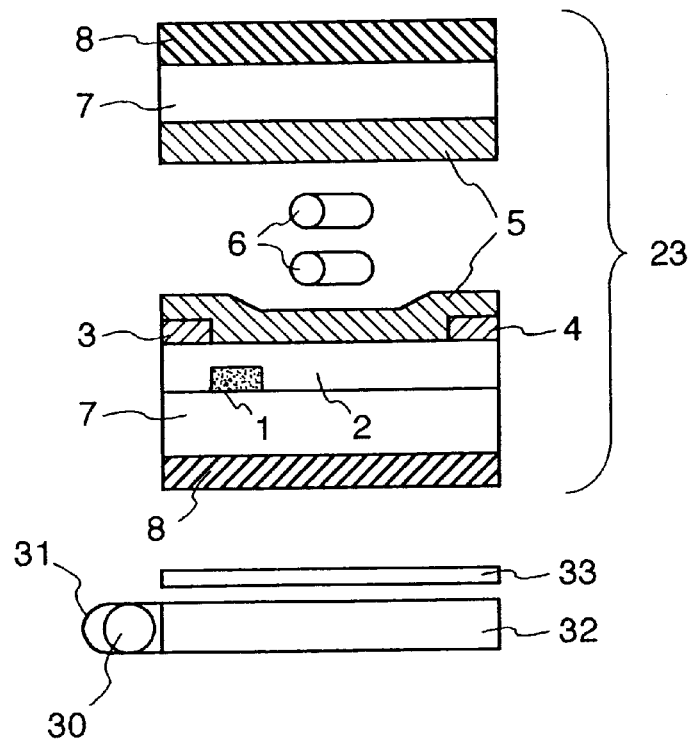
FIG. 24 shows an illustration of a color filter according to on embodiment of the present invention

In FIG. 24, reference numeral 7 designates two substrates made of glass plates, of which thickness is 1.1 mm. A thin film transistor is formed on one of the substrates (lower substrate in FIG. 24), and then an insulating layer 2 and an alignment film 5 are formed on the surface thereof. In this embodiment, poly-imide is used for the alignment film, and the rubbing-processing is performed to align the liquid crystal. The alignment film is also formed on the other substrate (upper substrate in FIG. 24) and then the rubbing-processing is performed. The directions of the rubbing at the upper and lower substrates are parallel with each other and have the angle of 75° with respect to a direction of the applied voltage, that is, $\Phi LC1=\Phi LC2=75°$.

Nematic liquid crystal composition is inserted between the substrates 7, of which the anisotropy of the dielectric constant is positive, +12.0, and the anisotropy of the refractive index is 0.079 (589 nm, 20° C.). The gap d between cells equals 3.02 $\mu$m in such a state that spherical polymer beads are scattered and sandwiched between the substrates and the liquid crystal is sealed in. As a result, the thickness of the whole liquid crystal layer $d_{LC}$ becomes equal to the gap d(3.02 $\mu$m). The $d_{LC} \cdot \Delta n$ (589 nm) equals 0.239$\mu$m, and from the wavelength dependance characteristic of the anisotropy of the refractive index, $d_{LC} \cdot \Delta n$ (490 nm) equals 0.244 $\mu$m. As a result, $d_{eff} \cdot \Delta n$ (490 nm) equals about 0.22 $\mu$m.

A pair of substrates 7 are sandwiched by two polarizers. A polarization axis of one substrate is set to satisfy $\Phi P1=75°$, and the polarization axis of the other substrate is set to satisfy $\Phi P2=-15°$. Thereby the liquid crystal display panel 23 shown in FIG. 24 is obtained.

As shown in FIG. 24, a back-light unit is provided as an illuminant for transmitting light to the liquid crystal display panel 23, which comprises a fluorescent lamp 30, a light cover 31, a guide 32 and a polarizer 33, and has the color temperature of 5885K.

It may be possible to make the back-light unit by using a plurality of fluorescent lamps, and preferably, provide a prism sheet between the polarizer 33 and the lower substrate 8.

In order to obtain a display closest to the achromatic color from the characteristics of the color of the liquid crystal display panel 23 itself except the color filter, the color temperature of the illuminant is determined. Its color temperature is the above 5885K.

Figure 25:
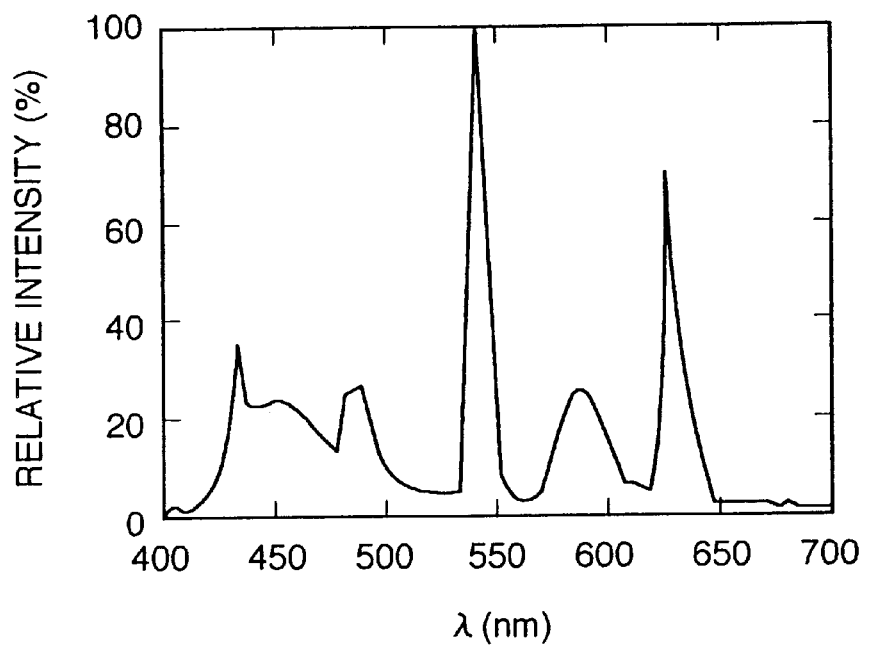
FIG. 25 shows an emission spectrum.
Figure 26:
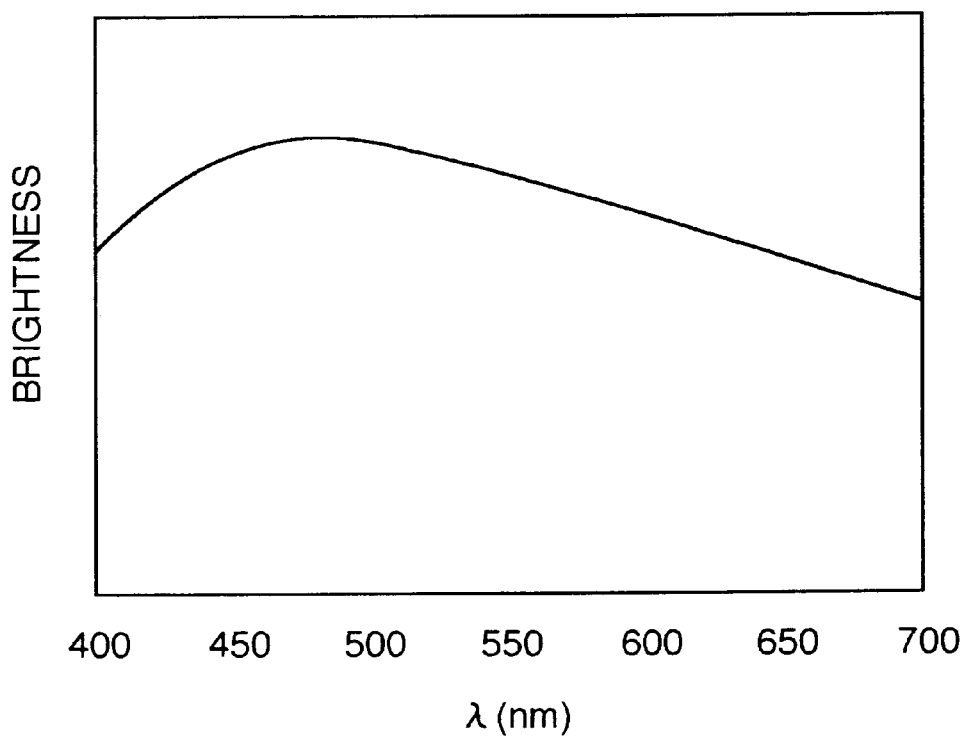
Figure 27:
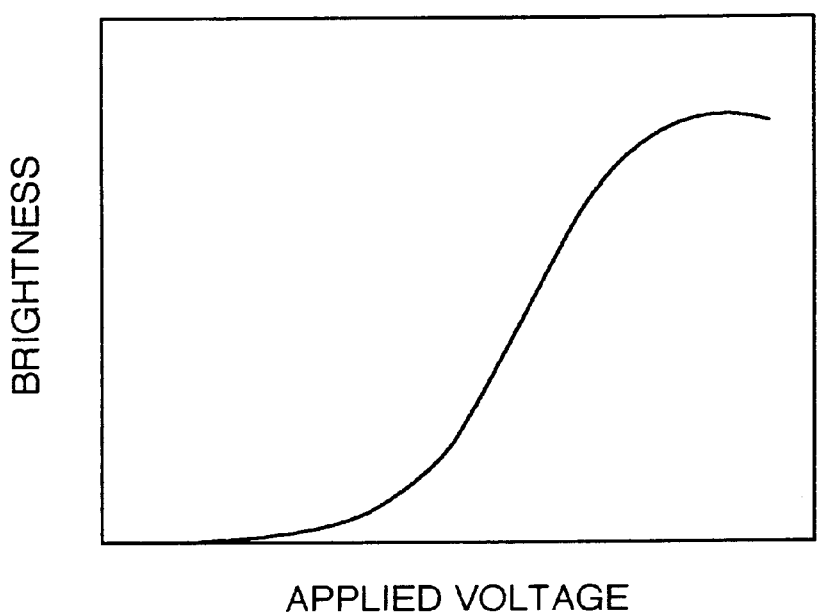
FIG. 27 shows one example of a driving circuit for the liquid crystal display apparatus.

The spectrum characteristic of the back-light is shown in FIG. 25, and the characteristic of the spectral transmittance in the light state of the liquid crystal display panel 23 except the color filter is shown in FIG. 26. In this embodiment, the dependence of the brightness of the liquid crystal display apparatus on a voltage is shown in FIG. 27.

As seen from FIG. 26, the color shift due to the intensity control is sufficiently suppressed in this embodiment.

COMPARISON EXAMPLE 1

Nematic liquid crystal composition is inserted between the substrates, of which the anisotropy of the dielectric constant is positive, +9.0, and the anisotropy of the refractive index is 0.082 (589 nm, 20° C.). The gap d between cells equals 3.83 $\mu$m.

In this comparison example, $d_{LC} \cdot \Delta n$ (589 nm) equals 0.310 $\mu$m, $d_{LC} \cdot \Delta n$ (490 nm) equals 0.321 $\mu$m. As a result, $d_{eff} \cdot \Delta n$ (490 nm) equals about 0.30 $\mu$m. This value is out of the present invention.

Figure 28:
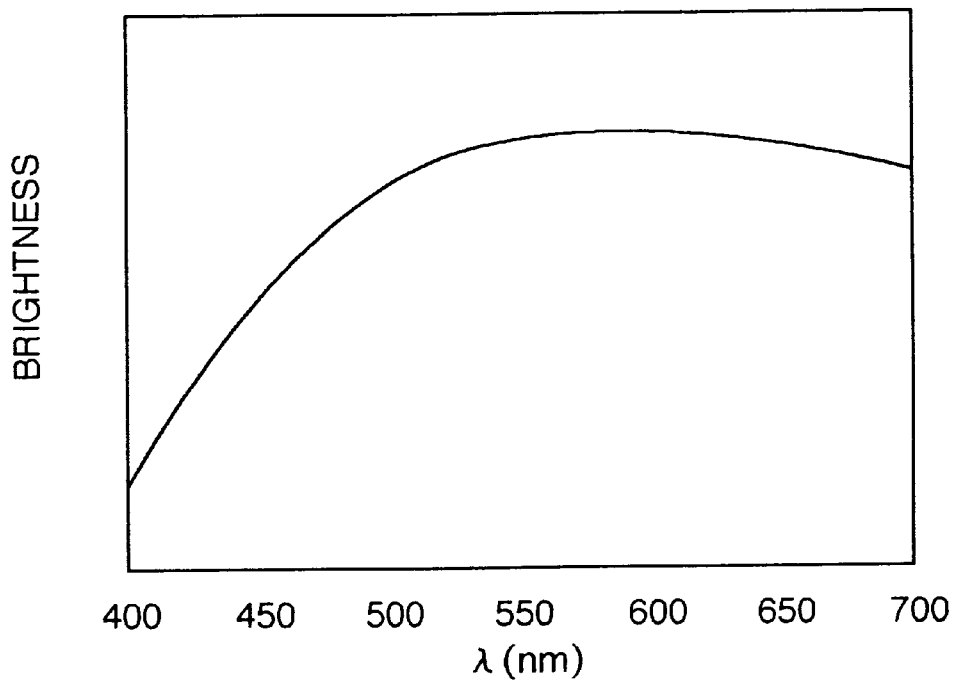
Figure 29:
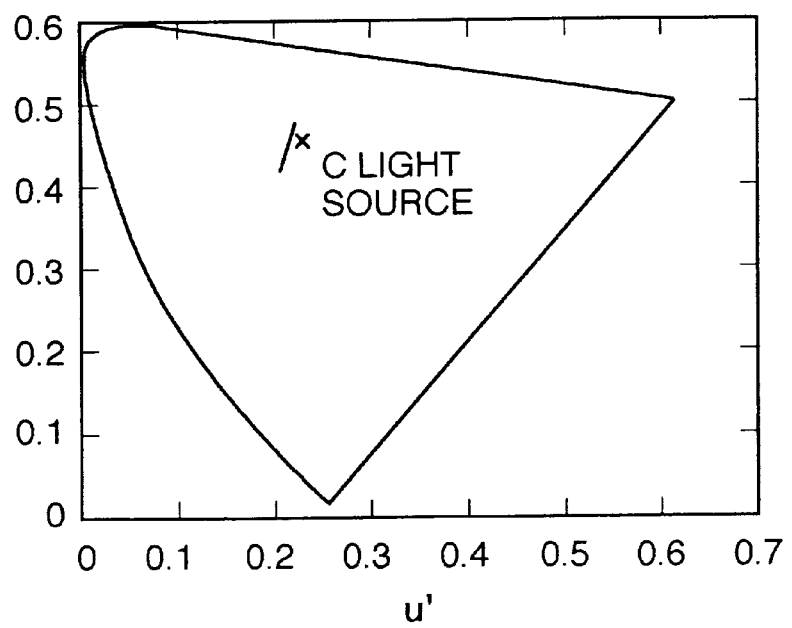
FIG. 29 shows an illustration of color shift.

The liquid crystal display panel is provided with an edge light type back-light unit using a cold cathode fluorescent lamp as a light source. The light source has a color temperature 6818K. The characteristic of the spectral transmittance in a light state, of the liquid crystal display apparatus without the color filter is as shown in FIG. 28, in which the transmittance in the short wavelength region is remarkably decreased. As a result, a trail appeared on chromaticity coordinates until a voltage of the liquid crystal display apparatus is switched from OFF (a dark state) to ON (a light state) is as shown in FIG. 29, in which color is shifted and the liquid crystal display panel itself is colored.

As seen from the comparison example 1, the color is shifted, as the dark state is shifted into the light state in the liquid crystal display apparatus using the liquid crystal display panel in which the transmittance at the short wavelength is reduced. According this comparison example, it is difficult to suppress the color shift in the color display and the coloring in the black and white display, and thus the quality of the displayed image essentially deteriorates.

COMPARISON EXAMPLE 2

In the comparison example 2, Nematic liquid crystal composition is inserted between the substrates, of which the anisotropy of the dielectric constant is positive, +9.0, and the anisotropy of the refractive index is 0.082 (589 nm, 20° C.). The gap d between cells equals 4.26 $\mu$m.

In this comparison example, $d_{LC} \cdot \Delta n$ (589 nm) equals 0.345 $\mu$m, $d_{LC} \cdot \Delta n$ (490 nm) equals 0.357 $\mu$m. As a result, $d_{eff} \cdot \Delta n$ (490 nm) becomes equal to about 0.33 $\mu$m. This value is also out of the present invention. It is understood that the transmittance for blue light is lessen.

Figure 30:
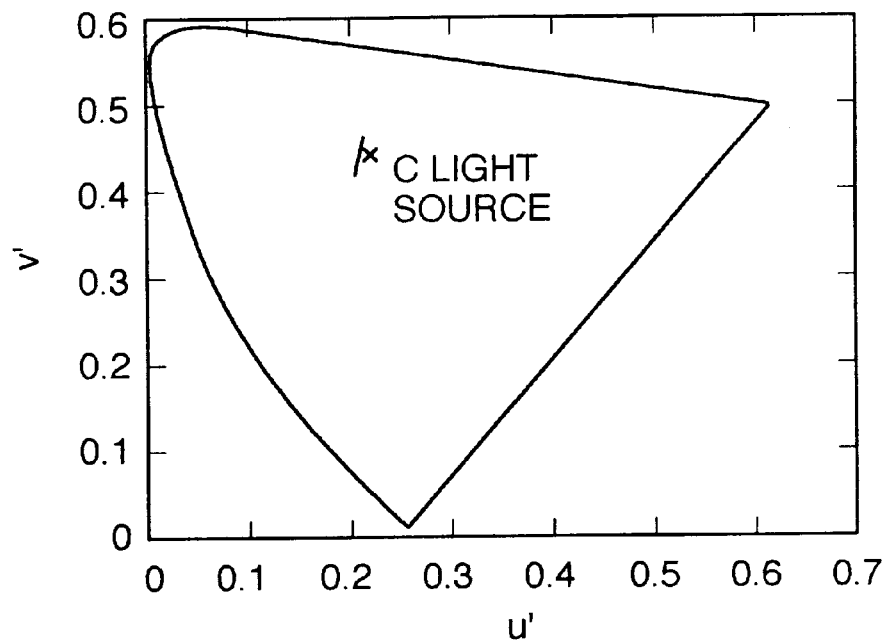
FIG. 30 shows an illustration of color shift.

The liquid crystal display panel is provided with an edge light type back-light unit using a cold cathode fluorescent lamp as a light source. The light source has a color temperature 6818K. A trail appeared on chromaticity coordinates until a voltage of the liquid crystal display apparatus is switched from OFF (a dark state) to ON (a light state) is as shown in FIG. 30. As seen from the comparison example 2, the color is shifted to yellowish color, as the dark state is shifted into the light state. Also according to this comparison example, it is difficult to improve the quality of the displayed image.

The change in the characteristic caused by the local change in the thickness of the liquid crystal will be explained with reference to embodiments and comparison examples.

EMBODIMENT A

The liquid crystal display apparatus has two substrates, one of which has a color filter with B,G and R on its surface. Nematic liquid crystal composition is inserted between the substrates, of which the anisotropy of the dielectric constant is positive, +12.0, and the anisotropy of the refractive index is 0.079 (589 nm, 20° C.). The gap d between cells is formed by scattering spherical polymer beads and sandwiching them between the substrates. The gap is adjusted to d=2.87 $\mu$m by selecting the radius of the beads.

In this comparison example, $d_{LC}\cdot\Delta n$ (589 nm) equals 0.227 $\mu$m, $d_{LC}\cdot\Delta n$ (490 nm) equals 0.232 $\mu$m. As a result, $d_{eff}\cdot\Delta n$ (490 nm) equals about 0.21 $\mu$m. This value is out of the present invention.

The liquid crystal display panel is provided with a back-light unit as a light source which has a color temperature 6818K.

EMBODIMENT B

The liquid crystal display apparatus has two substrates, one of which has a color filter with B,G and R on its surface. Nematic liquid crystal composition is inserted between the substrates, of which the anisotropy of the dielectric constant is positive, +12.0, and the anisotropy of the refractive index is 00079 (589 nm, 20° C.). The gap d between cells is formed by scattering spherical polymer beads and sandwiching them between the substrates. The gap is adjusted to d=3.17 $\mu$m by selecting the radius of the beads which is different from that in embodiment A.

In this embodiment, $d_{LC}\cdot\Delta n$ (589 nm) equals 0.250 $\mu$m, $d_{LC}\cdot\Delta n$ (490 nm) equals 0.256 $\mu$m. As a result, $d_{eff}\cdot\Delta n$ (490 nm) equals about 0.23 $\mu$m.

The liquid crystal display panel is provided with a back-light unit as a light source which has a color temperature 4703K.

COMPARISON EXAMPLE C

The liquid crystal display apparatus has two substrates, one of which has a color filter with B,G and R on its surface. Nematic liquid crystal composition is inserted between the substrates, of which the anisotropy of the dielectric constant is positive, +9.0, and the anisotropy of the refractive index is 0.082 (589 nm, 20° C.). The gap d between cells is adjusted to d=3.83 $\mu$m.

In this comparison example, dLC·$\Delta$n (589 nm) equals 0.314 $\mu$m, dLC·$\Delta$n (490 nm) equals 0.321 $\mu$m. As a result, deff·$\Delta$n (490 nm) equals about 0.30 $\mu$m. This value is out of the present invention.

The liquid crystal display panel is provided with a back-light unit as a light source which has a color temperature 6818K.

COMPARISON EXAMPLE D

The liquid crystal display apparatus has two substrates, one of which has a color filter with B,G and R on its surface. Nematic liquid crystal composition is inserted between the substrates, of which the anisotropy of the dielectric constant is positive, +9.0, and the anisotropy of the refractive index is 0.082 (589 nm, 20° C.). The gap d between cells is adjusted to d=4.26 $\mu$m.

In this comparison example, dLC·$\Delta$n (589 nm) equals 0.349 $\mu$m, $d_{LC}\cdot\Delta n$ (490 nm) equals 0.357 $\mu$m. As a result, $d_{eff}\cdot\Delta n$ (490 nm) equals about 0.33 $\mu$m. This value is also out of the present invention.

The liquid crystal display panel in the comparison example D is provided with a back-light unit as a light source which has a color temperature 6818K.

As clearly understand from the above description, there are the difference of 10% in the gap, respectively, between the embodiments A and B, and between the comparison examples C and D. Accordingly, it is possible to estimate the color shift caused by the change in the thickness deff ($\approx$d) of the liquid crystal layer, that is, the gap margin.

FIG. 16 shows the characteristic of the color difference $\Delta$Euv* to the applied voltage in the embodiments A and B, and the comparison examples C and D. The characteristic of the color difference can be obtained by using the color difference equation of main color family concerning L*u*v* proposed by CIE in 1976.

In general, the value of the color difference $\Delta$Euv* allowable in the sa me liquid crystal display panel is around 3 in such a liquid crystal display apparatus.

Figure 31:
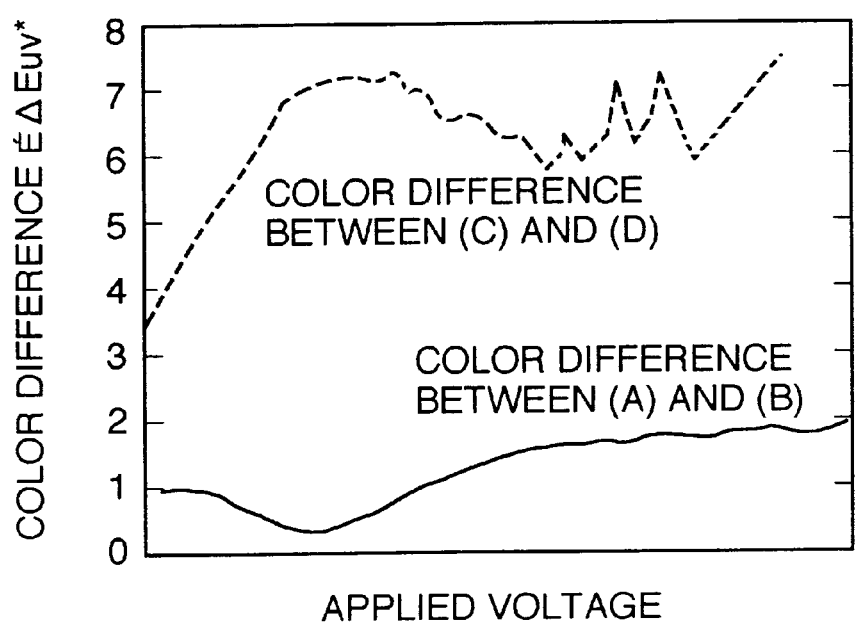
FIG. 31 shows one example of a driving circuit for the quid crystal display apparatus.

Referring now to FIG. 31, as clearly understood from the characteristic shown by a solid line of this figure, even if there are the difference of 10% in the gap between the embodiments A and B in the same display panel, the value of the color difference $\Delta$Euv* is held to less than 2. Accordingly, the color defect is not occurred in this case.

While, as clearly understood from the characteristic shown by a dotted line of FIG. 31, if there are the difference of 10% in the gap between the comparison examples C and D in the same display panel, the large color difference $\Delta$Euv* appears according to the applied voltage. Therefore, the remarkable color defect may be occurred in this case.

In the embodiments of the present invention, it is understood that even if there are the difference of 10% in the gap between the embodiments A and B in the same display panel, the color defect is not occurred in this case, and it is possible to obtain sufficient margin for the change in the gap.

The reason of the occurrence of the color difference in the embodiments and the comparison examples of the present invention will be explained from the view point of the difference of the passing characteristic at the colors, R,G and B.

Figure 32:
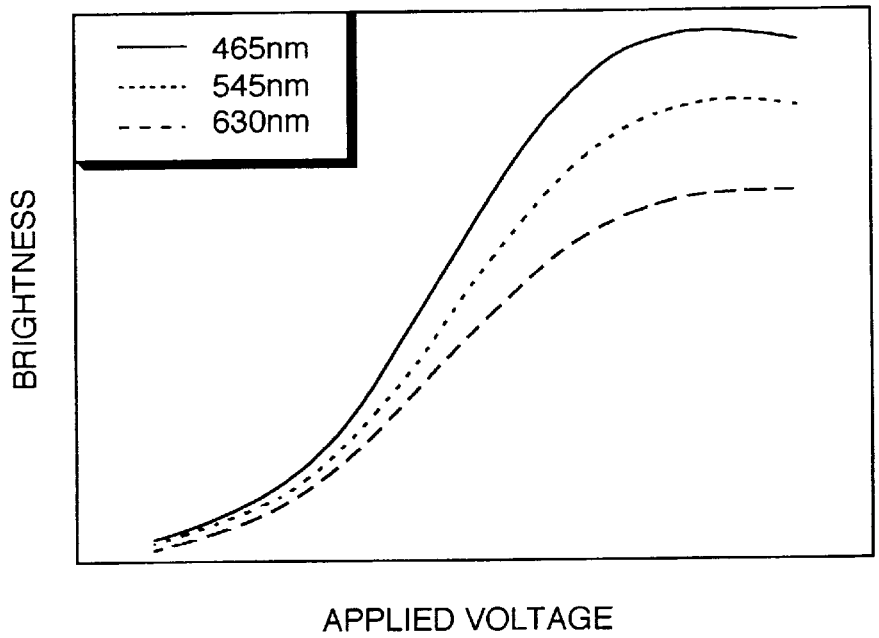
FIGS. 32 and 33 show the characteristics of the brightness to the applied voltage in the embodiments A and B by setting each of R,G and B as parameters.
Figure 33:
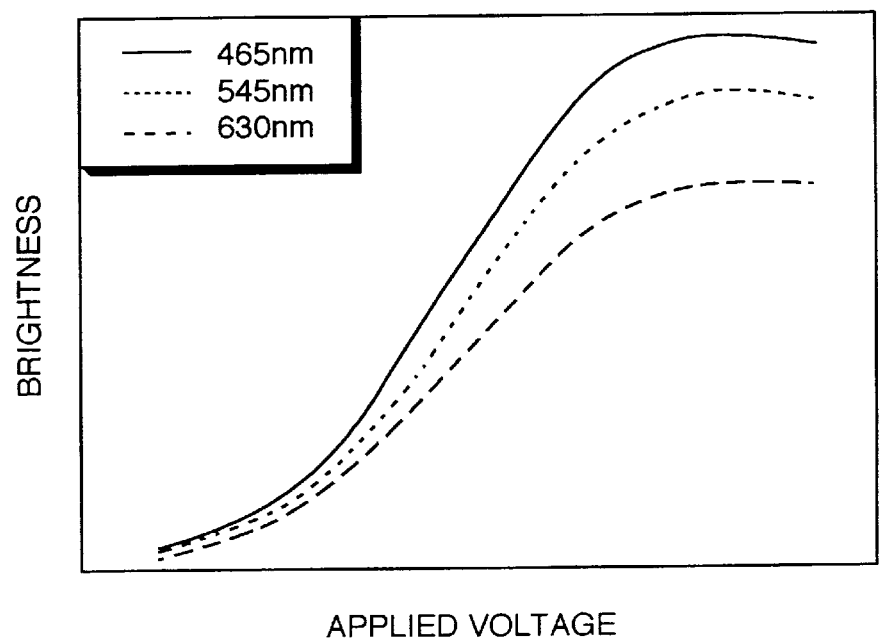
Figure 34:
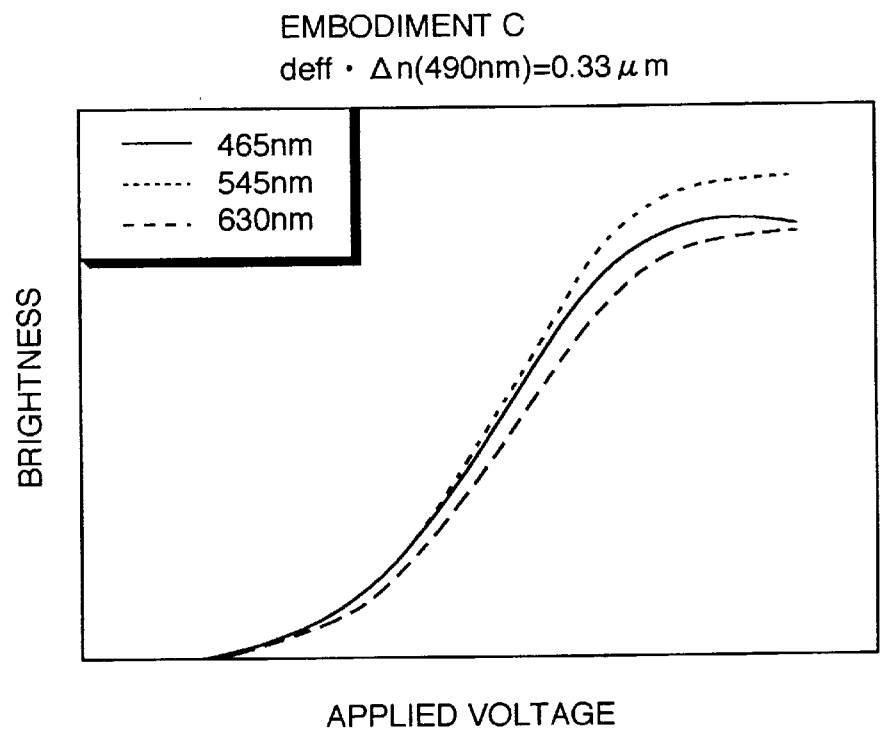
FIGS. 34 and 35 show the characteristics similar to those of FIGS. 31 and 32 with regard to the comparison examples C and D.
Figure 35:
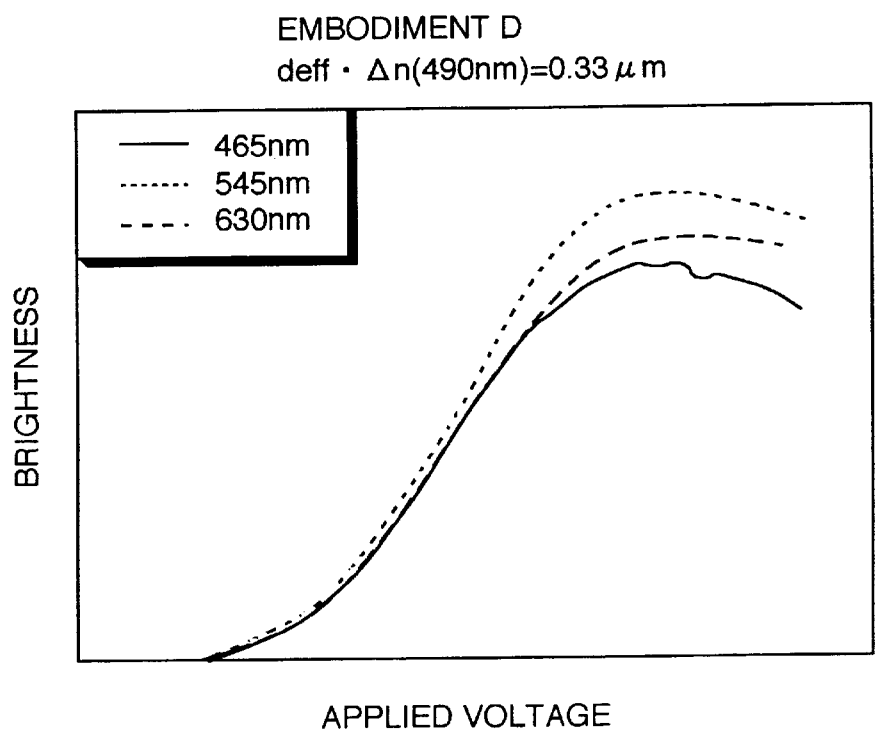

FIGS. 32 and 33 show the characteristics of the brightness to the applied voltage in the embodiments A and B by setting each of R,G and B as parameters. Further, FIGS. 34 and 35 show the characteristics similar to those of FIGS. 31 and 32 with regard to the comparison examples C and D.

where, the value of the wavelength of each color was measured by using the back-light with the luminescence characteristic shown in FIG. 25. the value of the wavelength of B (blue) was set to the middle value, 465 nm, of the spectra in a blue portion.

The following fact is clarified from these figures.

In the embodiments of the present invention shown in FIGS. 32 and 33, the tendency of the change in the characteristic of each color is the same until the display is switched from a dark state to a light state, and the contribution of a color to the brightness almost equals in each color. Accordingly, the color shift is not appeared in the embodiments.

In the comparison examples, the tendency (shown by a solid line) of the change in the characteristic of blue is different from those of red and green. As the applied voltage increases, the contribution of blue to the brightness decreases. Accordingly, in these examples, as the brightness increases, the component of blue is lessen. As a result, yellowish display appears and thus the color is shifted.

Figure 36:
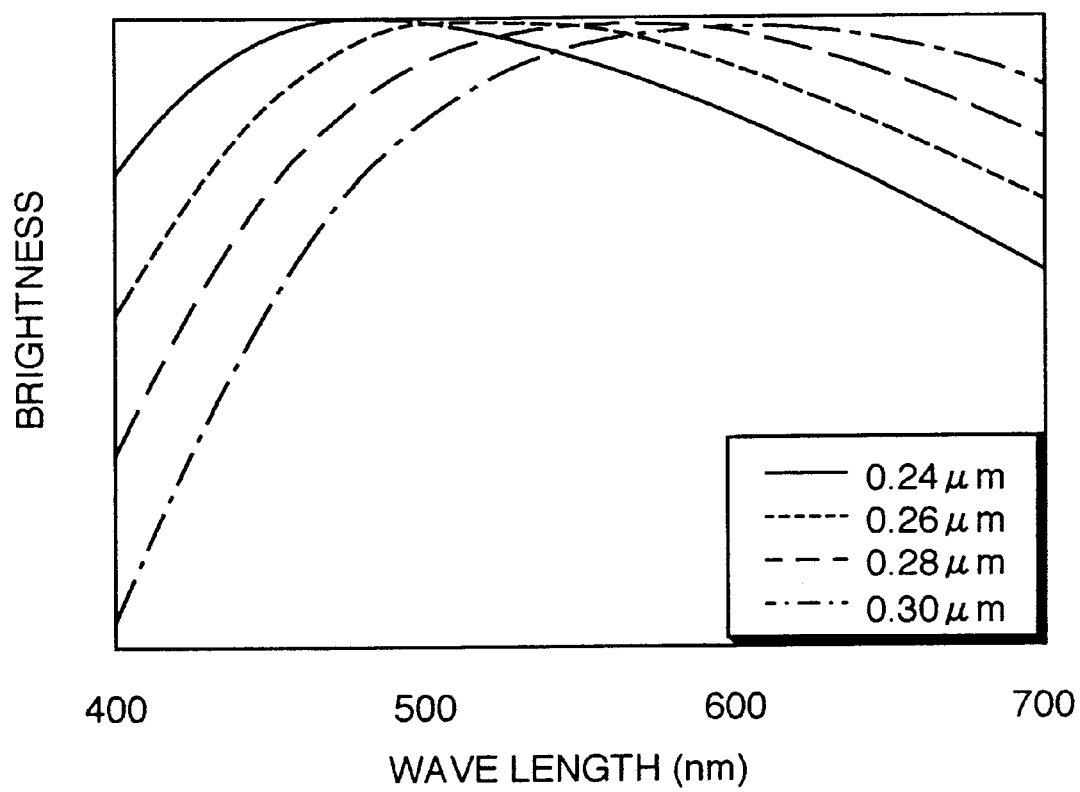
FIG. 36 shows a characteristic of transmittance.

In FIG. 36, the passing ratio of each wavelength in the light display is expressed in the brightness by setting the retardation deff·Δn (μm) as a parameter. As seen from FIG. 36, the brightness at the short wavelength region (blue region) less than 500 nm extremely changes and is remarkably reduced by small change in the retardation, deff·Δn.

It is important to maintain the relationship of the transmittance between three kinds of wavelength of R, G and B to the predetermined state.

The predetermined state means such a state that the transmittance in the wavelength of the longest wave among the spectra corresponding to blue of the emission spectra of the back-light, is always larger than that in the wavelength of 545 nm (green) and 630 nm (red).

Accordingly, the present invention must satisfy the condition that the above relationship is always maintained.

What is claimed is:

1. A liquid crystal display apparatus comprising a liquid crystal panel having a pair of substrates, a plurality of electrodes formed on at least one of said pair of substrates and a liquid crystal layer sandwiched between said pair of substrates, and a light source provided on one surface of said liquid crystal panel, wherein an electric field in said liquid crystal layer produced by said plurality of electrodes is predominantly in parallel with surfaces of said pair of substrates, and wherein said light source has a luminous characteristic with the chromaticity of a warm color family and said liquid crystal panel has a characteristic of spectral transmittance with the chromaticity of a cold color family, whereby the color of said light source can be compensated.

2. A liquid crystal display apparatus according to claim 1, wherein the maximum value of the spectral transmittance of the liquid crystal panel is within the range of wavelength from 400 nm to 520 nm.

3. A liquid crystal display apparatus according to claim 1, wherein the product of $d_{eff}$ and Δn is less than or equal to 0.26 μm, where, $d_{eff}$ is the thickness of the liquid crystal layer which changes the direction of liquid crystal alignment when a voltage is applied to said liquid crystal panel, and Δn the anisotropy of the refractive index of the liquid crystal.

4. A liquid crystal display apparatus according to claim 1, further comprising a pair of polarizers arranged so as to sandwich said pair of substrates in said liquid crystal panel, and a birefringent film arranged between a polarizer and a substrate.

5. A liquid crystal display apparatus according to claim 2, further comprising a pair of polarizers arranged so as to sandwich said pair of substrates in said liquid crystal panel, and a birefringent film arranged between a polarizer and a substrate.

6. A liquid crystal display apparatus comprising a liquid crystal panel having a pair of substrates, a plurality of electrodes formed on at least one of said pair of substrates and a liquid crystal layer sandwiched between said pair of substrates, and a light source provided on one surface of said liquid crystal panel, wherein said light source has a luminous characteristic with the chromaticity of a warm color family and said liquid crystal panel has a characteristic of spectral transmittance with the chromaticity of a cold color family, whereby the color of said light source can be compensated, and further comprising a color filter provided on at least one of said pair of substrates, and wherein the thickness of the liquid crystal layer at a portion where red light can be transmitted is thinner than the thickness of the liquid crystal layer at a portion where green light can be transmitted.

7. A liquid crystal display apparatus comprising a liquid crystal panel having a pair of substrates, a plurality of electrodes formed on at least one of said pair of substrates and a liquid crystal layer sandwiched between said pair of substrates, and a light source provided on one surface of said liquid crystal panel, wherein said light source has a luminous characteristic with the chromaticity of a warm color family and said liquid crystal panel has a characteristic of spectral transmittance with the chromaticity of a cold color family, whereby the color of said light source can be compensated, and further comprising a color filter provided on at least one of said pair of substrates, and wherein the thickness of the liquid crystal layer at a portion where blue light can be transmitted is thinner than the thickness of the liquid crystal layer at a portion where green light can be transmitted.

8. A liquid crystal display apparatus comprising a liquid crystal panel having a Pair of substrates, a plurality of electrodes formed on at least one of said pair of substrates and a liquid crystal layer sandwiched between said pair of substrates, and a light source provided on one surface of said liquid crystal panel, wherein said light source has the maximum value of at least one intensity in each range from 400 nm to 500 nm, from 500 nm to 600 nm and from 600 nm to 700 nm of said light source, and said liquid crystal panel has a characteristic of spectral transmittance required to satisfy the following equation, x>yx>z, where, x equals a value of the transmittance at the wavelength which shows the maximum value of the intensity in the range from 400 nm to 500 nm, y equals a value of the transmittance at the wavelength which shows the maximum value of the intensity in the range from 500 nm to 600 nm, z equals a value of the transmittance at the wavelength which shows the maximum value of the intensity in the range from 600 nm to 700 nm, and wherein an electric field in said liquid crystal layer produced by said plurality of electrodes is predominantly in parallel with surfaces of said pair of substrates.

9. A liquid crystal display apparatus comprising a liquid crystal panel having a pair of substrates, a plurality of electrodes formed on at least one of said pair of substrates and a liquid crystal layer sandwiched between said pair of substrates, and a light source provided on one surface of said liquid crystal panel, wherein said light source has a luminous characteristic with the chromaticity of a warm color family and said liquid crystal panel has a characteristic of spectral transmittance with the chromaticity of a cold color family, whereby the color of said light source can be compensated, and wherein said liquid crystal panel is configured so as to satisfy the following equation:

$$200 \text{ nm} \leq d_{eff} \cdot \Delta n \leq 250 \text{ nm}$$

where, $d_{eff}$ denotes the thickness of the liquid crystal layer, and Δn denotes the anisotropy of the refractive index of the liquid crystal.

* * * * *